US010265973B2

(12) United States Patent
Matsuzaki

(10) Patent No.: US 10,265,973 B2
(45) Date of Patent: Apr. 23, 2019

(54) RECORDING METHOD AND RECORDING APPARATUS

(71) Applicant: Seiko Epson Corporation, Tokyo (JP)

(72) Inventor: Akiko Matsuzaki, Matsumoto (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/890,505

(22) Filed: Feb. 7, 2018

(65) Prior Publication Data
US 2018/0236783 A1 Aug. 23, 2018

(30) Foreign Application Priority Data

Feb. 21, 2017 (JP) .................................. 2017-030065
May 23, 2017 (JP) .................................. 2017-101703

(51) Int. Cl.
B41J 11/00 (2006.01)
B41J 2/01 (2006.01)
(Continued)

(52) U.S. Cl.
CPC ............... *B41J 11/002* (2013.01); *B41J 2/01* (2013.01); *B41J 11/0015* (2013.01);
(Continued)

(58) Field of Classification Search
CPC ........ B41J 2/01; B41J 11/0015; B41J 11/002; B41M 5/0011; B41M 5/0047; B41M 5/0064; B41M 7/009; C09D 11/322
See application file for complete search history.

(56) References Cited

U.S. PATENT DOCUMENTS

2010/0194805 A1* 8/2010 Houjou .................. B41J 2/2121
347/14
2012/0162303 A1 6/2012 Sasaki
(Continued)

FOREIGN PATENT DOCUMENTS

DE 10 2008 030955 B3 11/2009
EP 1208992 A2 5/2002
(Continued)

OTHER PUBLICATIONS

Extended European Search Report for Patent Application No. EP 17208653.0, dated Jun. 28, 2018 (13 pages).

*Primary Examiner* — Anh T. N. Vo
(74) *Attorney, Agent, or Firm* — Harness, Dickey & Pierce, P.L.C.

(57) ABSTRACT

A recording method includes applying an ink composition onto a recording medium, primarily drying the recording medium during the application of the ink composition, transporting the recording medium applied the ink composition to a secondary drying device, and secondarily drying the recording medium with the secondary drying device. The variation in surface temperature of the recording medium from the primary drying temperature (T1) to the lowest temperature and the variation in surface temperature of the recording medium from T1 to the highest temperature, in the period from completion of the application of the ink composition to completion of the secondary drying are −40% or more and 370% or less, respectively, relative to T1. The surface temperature of the recording medium is increased to the secondary drying temperature at an average rate of 7° C./s or less after the completion of the application of the ink composition.

20 Claims, 2 Drawing Sheets

(51) Int. Cl.
*B41M 5/00* (2006.01)
*B41M 7/00* (2006.01)
*C09D 11/322* (2014.01)

(52) U.S. Cl.
CPC .......... *B41M 5/0011* (2013.01); *B41M 7/009* (2013.01); *C09D 11/322* (2013.01); *B41M 5/0047* (2013.01); *B41M 5/0064* (2013.01)

(56) References Cited

U.S. PATENT DOCUMENTS

| | | |
|---|---|---|
| 2013/0182057 A1 | 7/2013 | Koase |
| 2015/0029255 A1 | 1/2015 | Ohnishi |
| 2016/0137441 A1* | 5/2016 | La Vos ................. B41J 13/08 271/276 |
| 2016/0312061 A1* | 10/2016 | Aoai ................. C08G 73/0226 |

FOREIGN PATENT DOCUMENTS

| | | |
|---|---|---|
| EP | 2913371 A1 | 9/2015 |
| EP | 2939833 A1 | 11/2015 |
| JP | 2013-028089 A | 2/2013 |
| JP | 2013-028093 A | 2/2013 |
| JP | 2013-212670 A | 10/2013 |
| JP | 2015-205476 A | 11/2015 |
| JP | 2015-214064 A | 12/2015 |
| WO | WO-2009-127261 A1 | 10/2009 |

* cited by examiner

RECORDING METHOD AND RECORDING APPARATUS

BACKGROUND

1. Technical Field

The present invention relates to a recording method and a recording apparatus.

2. Related Art

There has been known an ink jet recording method for recording images on a recording medium by ejecting very small ink droplets from a recording head of an ink jet recording apparatus. The ink jet recording method is being studied for use for sign printing and high-speed label printing. For recording an image on a recording medium that is poorly absorbent of ink, such as art paper or coated paper, or on a recording medium that is non-absorbent of ink, such as plastic film, non-aqueous solvent-based ink compositions are used. In addition, aqueous ink compositions containing a resin emulsion are being studied for the ink jet recording method from the viewpoint of global environmental impact and human safety.

When these inks are used for printing, the recording medium is heated (for primary drying) with a platen heater during printing and is further heated (for secondary drying) in a drying oven after printing so as to fix and dry the ink satisfactorily. For example, JP-A-2015-205476 and JP-A-2013-28093 disclose recording methods for producing recorded images having high image quality and high fastness to rubbing (i.e., the ability to maintain its appearance even after rubbing), in which the ink is dried at a temperature controlled according to the amount of the applied ink or dried by controlling the temperature of the platen heater.

In these methods, however, temperature is not controlled until the recording medium printed thereon enters the drying oven. The recording medium is therefore rapidly cooled on the transport path thereof. Then, the cooled recording medium is rapidly heated in the drying oven. Such rapid temperature changes cause the recording medium to deform, or cause condensation on the surface of the recording medium. The condensation may degrade the rub fastness of the recorded images. Recording media including a plurality of layers, such as adhesive media tend to be largely deformed and warped because a volume expansion occurs between each layer and the next.

SUMMARY

An advantage of some aspects of the invention is that it provides a recording method that can prevent the recording medium from deforming and can produce recorded images having high image quality and/or high fastness to rubbing.

The following embodiments, or applications, can solve at least one of the issues described above.

Application 1

According to an embodiment of the invention, there is provided a recording method including applying an ink composition onto a recording medium, primarily drying the recording medium by increasing the surface temperature of the recording medium to a primary drying temperature during the application of the ink composition, transporting the recording medium onto which the ink composition has been applied to a secondary drying device, and secondarily drying the recording medium by increasing the surface temperature of the recording medium to a secondary drying temperature with the secondary drying device. The variation in surface temperature of the recording medium from the primary drying temperature to the lowest temperature and the variation in surface temperature of the recording medium from the primary drying temperature to the highest temperature, in the period from the completion of the application of the ink composition to the completion of the secondary drying are −40% or more and 370% or less, respectively, relative to the primary drying temperature. The surface temperature of the recording medium is increased to the secondary drying temperature at an average rate of 7° C./s or less after the completion of the application of the ink composition.

In this method, the surface temperature of the recording medium is controlled within a predetermined variation range after the application of the ink composition, thus preventing dimensional changes in the recording medium caused by thermal expansion. Also, by controlling the surface temperature of the recording medium so as to vary within a predetermined variation range, the ink is satisfactorily dried on the transport path. Consequently, the image quality and the rub fastness of resulting images are improved. Furthermore, when the variations in surface temperature of the recording medium from the primary drying temperature to the lowest temperature and to the highest temperature are −40% or more and 370% or less, respectively, relative to the primary drying temperature, heat is not wasted, and energy is saved.

Application 2

In an embodiment of the recording method, the recording medium may have a width of 350 mm or more.

The recording method of the disclosure is effective in using a recording medium having a width of 350 mm or more.

Application 3

In an embodiment of the recording method, the variation in surface temperature of the recording medium to the lowest temperature may be −35% or more.

When the variation in surface temperature to the lowest temperature is −35% or more, heat is not wasted, and the recording medium is further prevented from being deformed, allowing the formation of recorded images having high image quality and/or high fastness to rubbing.

Application 4

In an embodiment of the recording method, the secondary drying temperature may be higher than or equal to the primary drying temperature.

When the secondary drying temperature is higher than or equal to the primary drying temperature, the ink can be dried, and the recording medium is further prevented from being deformed, allowing the formation of recorded images having high image quality and/or high fastness to rubbing.

Application 5

In an embodiment of the recording method, the surface temperature of the recording medium may reach the secondary drying temperature within a period of 250 s from the completion of the application of the ink composition.

When the period of time from the completion of the ink composition until the surface temperature reaches the secondary drying temperature is within 250 s, the recording medium can be prevented from being deformed, allowing the formation of recorded images having high image quality and/or high fastness to rubbing.

Application 6

In an embodiment of the recording method, the primary drying temperature may be in the range of 30° C. to 60° C., and the secondary drying temperature may be in the range of 50° C. to 160° C.

By drying the recording medium at these temperatures, bleeding of the ink is reduced and, thus, high quality images having high fastness to rubbing can be formed.

Application 7

In an embodiment of the recording method, the recording medium may be transported along a transport path provided with a heating device or a heat-retaining device.

By providing the transport path with a heating device or a heat-retaining device, the surface temperature of the recording medium can be controlled so as not to decrease along the transport path.

Application 8

In an embodiment of the recording method, the recording medium may include a release sheet.

Even if the recording medium has a release sheet, the recording method can minimize the difference in volume expansion between the release sheet and the recording medium and, thus, can form recorded images having high quality and/or high fastness to rubbing.

Application 9

In an embodiment of the recording method, the surface temperature of the recording medium may reach the secondary drying temperature within a period of 60 s or less from when the recording medium has been transported to the secondary drying device.

In this instance, the recording medium can be further prevented from being deformed, allowing the formation of recorded images having high image quality and/or high fastness to rubbing.

Application 10

In an embodiment of the recording method, the recording medium may be transported along a transport path having a length of 500 mm or less from a point at which the application of the ink composition is completed to a point at which the recording medium reaches the secondary drying temperature.

In this instance, the recording medium can be further prevented from being deformed, allowing the formation of recorded images having high image quality and/or high fastness to rubbing.

Application 11

In an embodiment of the recording method, the ink composition may be an aqueous ink composition containing a coloring material, water, a resin, and a water-soluble organic solvent or a solvent-based ink composition containing a coloring material and an organic solvent.

The use of such an ink composition can further prevent the recording medium from being deformed, thus helping to form recorded images having high image quality and/or high fastness to rubbing.

Application 12

In an embodiment of the recording method, the ink composition may be an aqueous ink composition containing an organic solvent having a normal boiling point in the range of 150° C. to 280° C., but the content of an organic solvent having a normal boiling point of more than 280° C. is 3% by mass or less.

The use of such an ink composition can further prevent the recording medium from being deformed, thus helping to form recorded images having high image quality and/or high fastness to rubbing.

Application 13

In an embodiment of the recording method, the application of the ink composition may be performed by ejecting the ink composition from an ink jet head.

When the ink composition is applied by being ejected from an ink jet head, the recording medium can be prevented from being deformed, allowing the formation of recorded images having high image quality and/or high fastness to rubbing.

Application 14

In an embodiment of the recording method, the recording medium may be non-absorbent or poorly absorbent.

Even if recording is performed on a non-absorbent or poorly absorbent recording medium, the recording medium can be prevented from being deformed, allowing the formation of recorded images having high image quality and/or high fastness to rubbing.

Application 15

In an embodiment, the recording method may further include applying a reaction liquid containing a flocculant capable of forming an aggregate of at least one constituent of the ink composition onto the recording medium.

Even if the reaction liquid is used, the recording method can prevent the recording medium from being deformed, thus forming recorded images having high image quality and/or high fastness to rubbing. Also, the function of the flocculant to form an aggregate helps to form high-quality images.

Application 16

In an embodiment of the recording method, the maximum application rate of the ink composition applied to a region of the recording medium may be 3 mg/inch$^2$ or more.

Even when the ink composition is applied with a rate of 3 mg/inch$^2$ or more, the recording medium can be prevented from being deformed, allowing the formation of recorded images having high image quality and/or high fastness to rubbing.

Application 17

In an embodiment of the recording method, the primary drying temperature may be 40° C. or less, and the variation in surface temperature of the recording medium to the lowest temperature may be −10° C. or more.

When the primary drying temperature is 40° C. or less while the variation in surface temperature to the lowest temperature is −10% or more, the recording medium is further prevented from being deformed, allowing the formation of recorded images having high image quality and/or high fastness to rubbing.

Application 18

According to another aspect of the invention, there is provided a recording apparatus configured to perform the above-described recording method.

Since the recording method prevents the recording medium from being deformed and helps to form images having high image quality and/or high fastness to rubbing, the recording apparatus can produce such high-quality recorded images.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
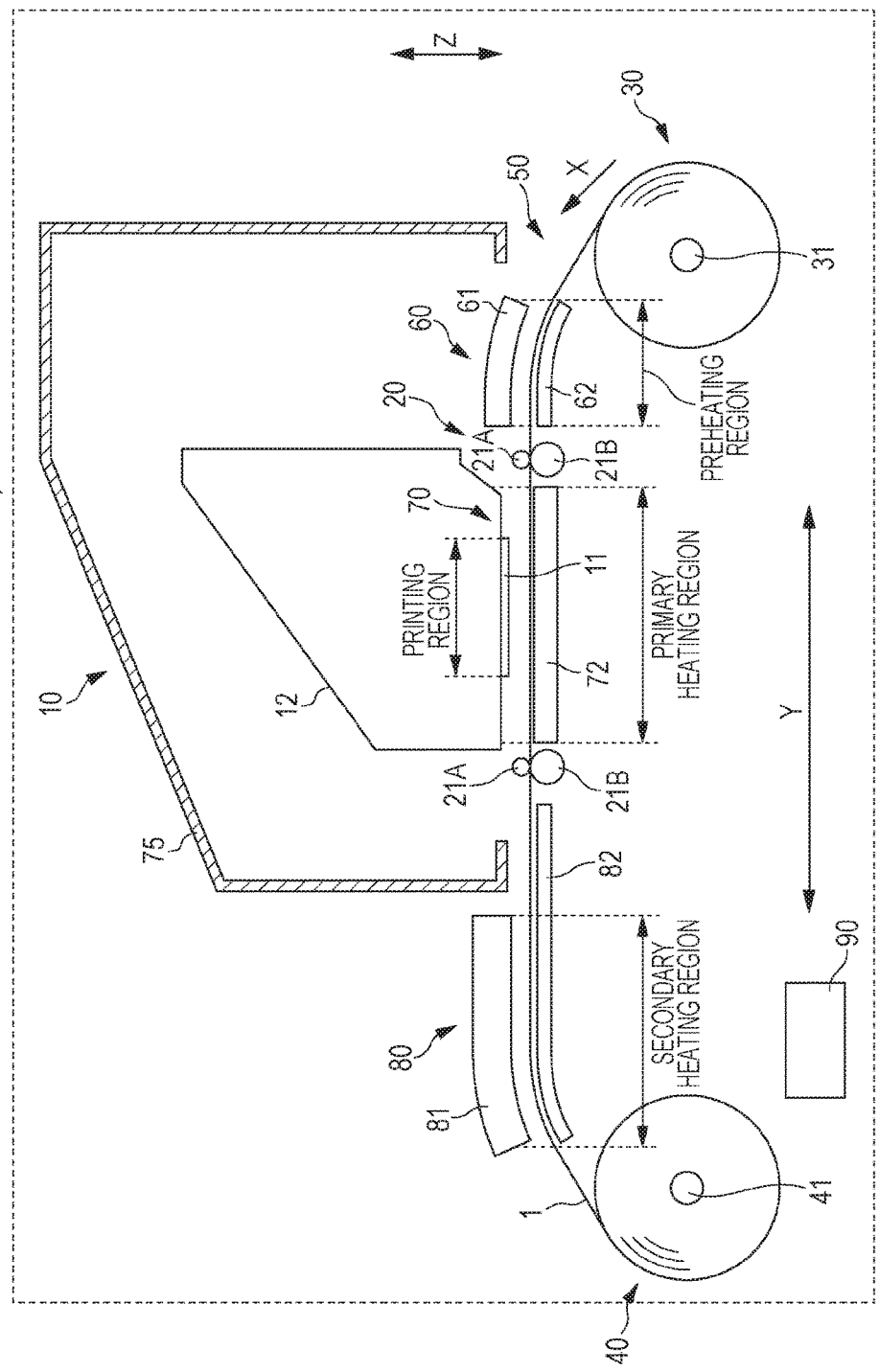
FIG. 1 is a schematic side view of an ink jet printer used in a recording method according to an embodiment of the invention.

Some embodiments of the invention will now be described. The following embodiments will be described by way of example. The invention is not limited to the following embodiments, and various modifications may be made within the scope and spirit of the invention. All the components disclosed in the following embodiments are not necessarily required for the invention.

The recording method according to an embodiment of the invention includes applying an ink composition onto a recording medium, primarily drying the recording medium by increasing the surface temperature of the recording medium to a primary drying temperature during the application of the ink composition, transporting the recording medium onto which the ink composition has been applied to a secondary drying device, and secondarily drying the recording medium by increasing the surface temperature of the recording medium to a secondary drying temperature with the secondary drying device. The variation in surface temperature of the recording medium from the primary drying temperature to the lowest temperature and the variation in surface temperature of the recording medium from the primary drying temperature to the highest temperature, in the period from the completion of the application of the ink composition to the completion of the secondary drying are −40% or more and 370% or less, respectively, relative to the primary drying temperature. The surface temperature of the recording medium is increased to the secondary drying temperature at an average rate of 7° C./s or less after the completion of the application of the ink composition.

Before describing the recording method of the present embodiment, the recording apparatus, the ink composition (hereinafter often referred to as ink) and a reaction liquid that are used in the recording method will be described.

1. Recording Apparatus

An exemplary recording apparatus used in the recording method of the present embodiment will first be described with reference to the drawings. However, the recording apparatus that can be used in the recording method of the present embodiment is not limited to the following apparatus.

For the sake of easy understanding, the dimensional proportions in each figure may be varied from the actual proportions. In the drawings, the Z axis has a vertical orientation, wherein the +Z direction is upward; and the Y axis has a front-rear orientation, wherein the +Y direction is frontward. Expressions used herein such as orthogonal, parallel, and constant are not in strict sense and may include errors that are allowable in terms of apparatus performance and that may occur in manufacture, even in the case where these expressions should be considered to be strict.

The recording apparatus used in the present embodiment may be an ink jet printer (hereinafter simply referred to as the printer) as shown in FIG. 1.

FIG. 1 is a schematic side view of a printer 100 embodying the recording apparatus of the present embodiment. The printer 100 allows a plurality of rolls of sheets (each corresponding to the recording medium) 1 to be loaded in parallel, and is thus a multi-roll ink jet printer capable of recording (printing) images on the plurality of roll sheets 1.

The printer 100 includes a recording section 10, a transport section 20, a medium supply section 30, a winding section 40, a transport route (transport path) 50, a preheating section 60, a first heating section (primary drying device) 70, a second heating section (secondary drying device) 80, and a control section 90. The recording section 10, the preheating section 60 and the first heating section 70 of the printer 100 are disposed within an enclosure 75, and the control section 90 controls the entire operation of the printer 100.

The roll sheet 1 is fed from the supply section 30 to the recording section 10 on the transport route 50 for recording and is then wound into a roll in the winding section 40. The material of the roll sheet 1 may be high-quality paper, cast-coated paper, art paper, coat paper, synthetic paper, or a plastic film, such as polyethylene terephthalate (PET) film or polypropylene (PP) film. The roll sheet 1 may be a label sheet including a plurality of labels pasted on a strip of a release sheet (roll sheet) with a gap between each label and the next label.

The recording section 10 includes a recording head 11, a carriage 12, and a guide shaft (not shown). The recording head 11 is an ink jet head having a plurality of nozzles through which droplets of ink, a reaction liquid, or the like are ejected. The recording head 11 opposes a portion of the roll sheet 1 in a region. This region is a printing region.

The recording head 11 may be of a known type. For example, the recording head may eject droplets by vibration of piezoelectric elements, hence forming droplets by mechanical deformation of electrostrictive elements. The guide shaft extends in a direction (scanning direction) intersecting the direction X in which the roll sheet 1 is fed (hereinafter referred to as transport direction). The recording head 11 is mounted on the carriage 12. The carriage 12 is driven for reciprocal movement (scan) along the guide shaft by a carriage motor (not show) controlled by the controller 90. Thus, a desired image is formed (recorded) on a portion of the roll sheet 1 by alternately repeating the operation of ejecting ink droplets from the recording head 11 while the carriage 12 is moved in a scanning direction and the operation of feeding the roll sheet 1 along the transport direction X by the transport section 20.

The recording head 11 of the recording section 10 in the present embodiment is a serial head that moves reciprocally in the scanning directions. In some embodiments, a line head having ink ejection nozzles arranged across the roll sheet 1, in a direction intersecting the transport direction X over the range. Also, the recording apparatus may be a printer including a recording head other than what is called an ink jet head.

The transport section 20 is a mechanism configured to feed the roll sheet 1 in the transport direction X at the recording section 10 and includes two pairs of rollers 21A and 21B. The rollers 21A and 21B of each pair are each in rotatable contact with the periphery of the other roller. Each pair of the rollers 21A and 21B is driven for rotation by a motor (not shown) controlled by the controller 90. The roll sheet 1 is transported along the transport route 50 by rotating the two pairs of the rollers 21A and 21B, each pinching a portion of the roll sheet 1. The transport section 20 is not limited to the mechanism including those rollers and may be a mechanism including a transport belt.

The supply section 30 is a housing in which the roll sheet 1 to be printed is housed. The supply section 30 is located upstream from the recording section 10 on the transport route 50 and includes a feeding shaft 31. The feeding shaft 31 is rotated by a feeding motor (not shown) controlled by the controller 90 for driving the shaft, thereby feeding the roll sheet 1 to the recording section 10 downstream from the supply section 30.

The winding section 40 is a housing in which the roll sheet 1 that has been printed is housed. The winding section 40 is located downstream from the recording section 10 on the transport route 50 and includes a winding shaft 41. The winding shaft 41 is rotated by a winding motor (not shown) controlled by the controller 90 for driving the shaft. Thus, the roll sheet 1 fed from the recording section 10 is wound on the winding shaft 41.

The transport route 50 is a transport path along which the sheet 1 is transported to the winding section 40 from the supply section 30 through the recording section 10. The transport route 50 includes a medium support 62, a platen 72, and another medium support 82, each configured to support the sheet 1 in the recording section 10.

The preheating section 60 preliminarily heats the surface of a portion of the roll sheet 1 (preheating) and is located along the transport route 50, downstream from the supply section 30 and upstream from the recording section 10. By preliminarily heating a portion of the roll sheet 1 before ejecting the ink composition, high-quality images in which bleeding is minimized can be formed particularly when the roll sheet 1, or recording medium, is non-absorbent or poorly absorbent. Beneficially, the preheating temperature is 30° C. to 60° C.

The preheating section 60 includes a preheating unit 61 for heating or heat retaining. The preheating unit 61 includes a heater that opposes the surface of the roll sheet 1 transported on the medium support 62. The heater may include a heating resistor, and may further include a reflection plate that helps the heater to efficiently irradiate the roll sheet 1 with infrared radiation from the heater. The medium support 62 may be provided with a heater. In the embodiment shown in FIG. 1, the preheating unit 61 and the medium support 62 have the same length in the Y direction, defining the entirety of the region heated by the preheating unit 61 as a preheating region.

The first heating section 70 heats the surface of a portion of the roll sheet 1 to a primary drying temperature while ink droplets are being applied onto the portion and is located along the transport route 50, downstream from the preheating section 60 and upstream from the winding section 40. The first heating section 70 may be in a structure (for example, platen heater) including a heater at the position of the platen 72 opposing the recording head 11, or may be in a structure (for example, IR heater) in which the recording head 11 has a heater. Beneficially, the heater of the first heating section 70 heats the surface of a portion of the roll sheet 1, or recording medium, to a primary drying temperature of 30° C. or more while the ink composition is being applied onto the portion. Thus, the ink composition attached to the sheet 1 is rapidly dried, thereby reducing bleeding.

The heater of the first heating section 70 that may be a platen heater or an IR heater is a device that heats the surface of a portion of the roll sheet 1, or the recording medium, while the ink composition is being ejected onto the portion from the recording head 11, and the IR heater can heat the recording medium from the recording head 11 side. The IR heater is likely to heat the recording head 11 simultaneously with the recording medium, but can increase the temperature of the recording medium without being affected by the thickness of the recording medium, unlike the case of the platen heater that heats the recording medium from the rear side. On the other hand, the platen heater can heat the recording medium from the side opposite to the recording head 11. This hinders the recording head 11 from being heated, thus reducing clogging of the nozzles of the recording head 11. The entirety of the region heated by the platen heater or the IR heater is defined as the primary heating region.

The second heating section 80 heats the portion of the roll sheet 1 subjected to recording (onto which ink droplets are ejected) for secondary drying and is located along the transport route 50, downstream from the recording section 10 and upstream from the winding section 40. The water and other solvents in the ink composition attached to the surface of the recording medium on which an image has been just recorded are rapidly evaporated to be removed, and the resin and other constituents remaining in the ink composition form a coating film. Consequently, the dried ink is firmly fixed (adheres) to the recording medium, thus forming a high-quality image having high fastness to rubbing in a short time.

The second heating section 80 includes a heating unit 81 for heating or heat retaining. The heating unit 81 includes a heater that opposes the surface of the portion of the roll sheet 1 transported on the medium support 8, onto which the ink droplets have been ejected 2. The heater may include a heating resistor, and may further include a reflection plate that helps the heater to efficiently irradiate the toll sheet 1 with infrared radiation from the heater. Beneficially, the heater of the second heating section 80 heats the surface of a portion of the recording medium to a higher temperature (secondary drying temperature) than the primary drying temperature in the first heating section 70, for example, to a temperature in the range of 50° C. to 160° C. In the embodiment shown in FIG. 1, the heating unit 81 and the medium support 82 have the same length in the Y direction, defining the entirety of the region heated by the heating unit 81 as a secondary heating region.

The phrase "heats the recording medium", "heating the recording medium" or similar expression used above means increasing the surface temperature of the recording medium to a predetermined temperature, and does not necessarily mean directly heating the recording medium. The drying temperature of the recording medium is determined by measuring the surface temperature of the recording medium.

In the printer 100, the length along the transport route 50 from the point where the application of the ink composition onto a portion of the roll sheet 1, or recording medium, is completed to the point where the surface of the portion reaches a secondary drying temperature may be 500 mm or less. This length is preferably 400 mm or less, more preferably 300 mm or less, and still more preferably 250 mm or less. The lower limit of the length may be, but is not limited to, 30 mm or more, and is preferably 50 mm or more, more preferably 100 mm or more, still more preferably 150 mm or more. The transport route, or transport path, having a length in such a range prevents the recording medium from being deformed and helps to form recorded images having high image quality and/or high fastness to rubbing. Such a length is beneficial in terms of easy designing of the transport route 50.

The length of the transport route 50 may be, but depends on the transporting speed (mm/s) of the roll sheet 1, such that the surface temperature of the recording medium can reach the secondary drying temperature within a period of 250 s, preferably in a period of 200 s or less, more preferably 150 s or less, still more preferably 100 s or less, further preferably 60 s or less, from the completion of the application of the ink composition to the recording medium.

The enclosure 75 of the printer 100 is configured not only to cover the entire region from the preheating region to the primary heating region but also to cover the region between the primary heating region and the secondary heating region. Thus, the enclosure 75 functions as a heat retaining device to keep the surface temperature of the portion of the roll sheet 1 transported from the primary heating region to the secondary heating region from decreasing. Furthermore, to keep constant the surface temperature of the portion of the roll sheet 1 transported from the primary heating region to the secondary heating region, another heating device may be provided for heating the portion of the roll sheet 1 onto which the ink composition has been applied, before secondary drying. The heating unit 81 of the second heating section 80 may be long, while the length between the primary heating region and the secondary heating region is small. Also, the region between the primary heating region and the secondary heating region may be covered with a hood.

In the present embodiment, the printer 100 may have a fan (not shown), for example, downstream from the second heating section 80. The fan is intended to efficiently cool the ink composition on a portion of the roll sheet 1 after drying the ink composition by the heater. By cooling the ink composition with the fan, the ink composition can form a coating on the roll sheet 1, or recording medium, with good adhesion.

2. Ink Composition

The ink composition used in the recording method of the present embodiment is an aqueous ink composition containing a coloring material, water, a resin, and a water-soluble organic solvent or a solvent-based ink composition containing a coloring material and an organic solvent. The ink composition used in the recording method of the present embodiment will now be described.

2. 1. Aqueous Ink Composition

The aqueous ink composition used in the recording method of the present embodiment contains a coloring material, water, a resin, and a water-soluble organic solvent. The aqueous ink composition used herein contains water as a dominant solvent.

2. 1. 1. Coloring Materials:

The coloring material contained in the aqueous ink composition may be a dye or a pigment. Pigments are not easily discolored by light or gases and are therefore advantageous. Accordingly, images formed with a pigment on a recording medium such as a plastic film are resistant to water, gases, light, and the like, exhibiting good storage stability.

Pigments that can be used as the color material include, but are not limited to, inorganic pigments and organic pigments. Exemplary inorganic pigments include titanium oxide, iron oxide, and carbon blacks produced by known methods, such as the contact method, the furnace method, and the thermal method. Exemplary organic pigments include azo pigments, such as azo lake, insoluble azo pigments, condensed azo pigments, and chelate azo pigments; polycyclic pigments, such as phthalocyanine pigments, perylene pigments, perinone pigments, anthraquinone pigments, and quinophthalone pigments; and nitro pigments, nitroso pigments, and aniline black.

The carbon blacks that can be used as the pigment in the present embodiment include C. I. Pigment Black 7, such as furnace black, lampblack, acetylene black, and channel black; and commercially available carbon blacks. Examples of commercially available carbon blacks include No. 2300, 900, MCF88, No. 20B, No. 33, No. 40, No. 45, No. 52, MA7, MA8, MA100, and No. 2200B (each produced by Mitsubishi Chemical); Color Blacks FWI, FW2, FW2V, FW18, FW200, 5150, S160, and 5170, Pritex 35, Pritex U, Pritex V, Pritex 140U, and Special Blacks 6, 5, 4A, 4, and 250 (each produced by Degussa); and Conductex SC, Raven 1255, Raven 5750, Raven 5250, Raven 5000, Raven 3500, Raven 1255, and Raven 700 (each produced by Carbon Columbia); and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12 8each produced by Cabot).

Pigments that can be used in the yellow ink composition include C. I. Pigment Yellows 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Pigments that can be used in the magenta ink composition include C. I. Pigment Reds 5, 7, 12, 48(Ca), 48(Mn), 57(Ca), 57:1, 112, 122, 123, 168, 184, 202, and 209, and C. I. Pigment Violet 19.

Pigments that can be used in the cyan ink composition include C. I. Pigment Blues 1, 2, 3, 15:3, 15:4, 16, 22, and 60.

Pigments that can be used in the green ink composition include C. I. Pigment Greens 7, 8, and 36.

Pigments that can be used in the orange ink composition include C. I. Pigment Oranges 43, 51, and 66.

For other color inks such as a green ink and an orange ink, known pigments can be used. A pigment may be used singly, or two or more pigments may be used in combination.

The content of the coloring material may be in the range of 1.0% by mass to 20% by mass and is preferably in the range of 1.5% by mass to 10% by mass, such as 2% by mass to 7% by mass, relative to the total mass of the ink composition.

If a pigment is used as the coloring material, it is beneficial that the pigment is kept dispersed stably in water. For this purpose, the pigment may be used in the form of dispersion in which the pigment is dispersed with a resin dispersant, such as a water-soluble resin and/or a water-dispersible resin (the pigment in this form is hereinafter referred to as resin-dispersed pigment dispersion), or in which the pigment is dispersed with a dispersant (the pigment in this form is hereinafter referred to as dispersant-dispersed pigment dispersion). Alternatively, a hydrophilic functional group may be chemically or physically introduced to the surfaces of the pigment particles so that the pigment can be dispersed or dissolved in water without using a resin dispersant or any other dispersant (this type of pigment is hereinafter referred to as surface-treated pigment).

Any of the resin-dispersed pigment dispersion, the dispersant-dispersed pigment dispersion, and the surface-treated pigment can be used in the ink composition of the present embodiment. Although these pigments may be used in combination as needed, it is advantageous that the ink composition contain a resin-dispersed pigment dispersion.

Examples of the resin dispersant used in the resin-dispersed pigment dispersion include polyvinyl alcohols, polyacrylic acid, acrylic acid-acrylonitrile copolymer, vinyl acetate-acrylic ester copolymer, acrylic acid-acrylic ester copolymer, styrene-acrylic acid copolymer, styrene-methacrylic acid copolymer, styrene-methacrylic acid-acrylic ester copolymer, styrene-α-methylstyrene-acrylic acid copolymer, styrene-α-methylstyrene-acrylic acid-acrylic ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer, vinyl acetate-acrylic acid copolymer, and salts thereof. Among these, preferred are copolymers of a monomer having a hydrophobic functional group and a monomer having a hydrophilic functional group, and polymers formed of a monomer having both a hydrophobic functional group and a hydrophilic functional group. If a copolymer is used, the copolymer may be a random copolymer, a block copolymer, an alternating copolymer, or a graft copolymer.

The above-mentioned salts used as the resin dispersant may be formed with a basic compound, such as ammonia, ethylamine, diethylamine, triethylamine, propylamine, isopropylamine, dipropylamine, butylamine, isobutylamine, diethanolamine, triethanolamine, triisopropanolamine, aminomethylpropanol, or morpholine. The amount of the basic compound added is not limited as long as it is equal to or more than the neutralization equivalent of the resin dispersant.

Preferably, the resin dispersant has a weight average molecular weight in the range of 1,000 to 100,000, more preferably in the range of 3,000 to 10,000. Use of a resin dispersant having a molecular weight in such a range allows the coloring agent to be stably dispersed in water, and facilitates the control of viscosity of the resulting ink composition.

The resin dispersant is commercially available. Examples of the commercially available resin dispersant include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240), all of which are products of BASF Japan.

Examples of the surfactant used in the surfactant-dispersed pigment include anionic surfactants, such as alkane sulfonates, α-olefin sulfonates, alkylbenzene sulfonates, alkylnaphthalene sulfonates, acylmethyltaurinates, dialkyl sulfosuccinates, alkylsulfates, sulfated olefins, polyoxyethylene alkyl ether sulfates, alkylphosphates, polyoxyethylene alkyl ether phosphates, and monoglyceride phosphates; amphoteric surfactants, such as alkylpyridium salts, alkylamino salts, and alkyldimethylbetaine; and nonionic surfactants, such as polyoxyethylene alkyl ethers, polyoxyethylene alkylphenyl ethers, polyoxyethylene alkyl esters, polyoxyethylene alkyl amides, glycerol alkyl esters, and sorbitan alkyl esters.

Preferably, the proportion of the resin dispersant or the surfactant to the pigment is 1 part by mass to 100 parts by mass, more preferably 5 parts by mass to 50 parts by mass, relative to 100 parts by mass of the pigment. When the dispersant is used in such a proportion, the pigment can be stably dispersed in water.

Examples of the hydrophilic functional group introduced to the surface-treated pigment include —OM, —COOM, —CO—, $SO_3M$, —$SO_2NH_3$, —$RSO_3M$, —$PO_3HM$, —$PO_3M_3$, —$SO_3NHCOR$, —$NH_3$, and —$NR_3$ (in the formula, M represents a hydrogen atom, an alkali metal, ammonium, or an organic ammonium, and R represents an alkyl group having a carbon number of 1 to 12, a substituted or unsubstituted phenyl group, or a substituted or unsubstituted naphthyl group). These functional groups can be physically or chemically introduced by being grafted onto the surfaces of the pigment particles directly or with a multivalent group therebetween. The multivalent group may be an alkylene group having a carbon number of 1 to 12, a substituted or unsubstituted phenylene group, or a substituted or unsubstituted naphthylene group.

Preferably, the surface of the surface-treated pigment is treated with an agent containing sulfur so that —$SO_3M$ and/or —$RSO_3M$ (M represents a counterion, such as hydrogen ion, an alkali metal ion, ammonium ion, or an organic ammonium ion) can be chemically bound to the surfaces of the pigment particles. More specifically, for preparing such a surface-treated pigment, a pigment is dispersed in a solvent that has no active proton and is nonreactive to sulfonic acid, and that does not dissolve or easily dissolve the pigment. Subsequently, the surfaces of the pigment particles are treated with amidosulfonic acid or a complex of sulfur trioxide and a tertiary amine so that —$SO_3M$ and/or —$RSO_3M$ can be chemically bound to the surfaces of the pigment particles. The surface-treated pigment may be thus prepared so as to be dispersed and/or dissolved in water.

For grafting any of the above-cited functional groups or a salt thereof onto the surfaces of the pigment particles directly or with a multivalent group therebetween, various known methods can be applied. For example, a commercially available oxidized carbon black may further be oxidized with ozone or a sodium hypochlorite solution so that the surfaces of the carbon black become more hydrophilic, as disclosed in, for example, JP-A-7-258578, JP-A-8-3498, JP-A-10-120958, JP-A-10-195331, and JP-A-10-237349. A carbon black may be treated with 3-amino-N-alkyl-substituted pyridium bromide, as disclosed in, for example, JP-A-10-195360 and JP-A-10-330665. An organic pigment may be dispersed in a solvent not dissolving or not easily dissolving the organic pigment, and the sulfone group is introduced into the surfaces of the pigment particles with a sulfonating agent, as disclosed in, for example, JP-A-8-283596, JP-A-10-110110, and JP-A-10-110111. An organic pigment may be dispersed in a basic solvent that can form a complex with sulfur trioxide, and sulfur trioxide is added to the dispersion to introduce the sulfone group or sulfoneamino group to the surfaces of the organic pigment particles, as disclosed in, for example, JP-A-10-110114. Any technique can be applied for preparing the surface-treated pigment without being limited to the above methods.

One type or a plurality of types of functional group may be grafted onto the particles of the pigment. What type of and how much the functional group is grafted can be appropriately selected in view of the stability of the pigment particles in the ink, the color density of the ink, and the ease of drying the ink at the front of the ink jet head.

For preparing a resin-dispersed pigment dispersion or a surfactant-dispersed pigment dispersion, a pigment, water, and a resin dispersant (for resin-dispersed pigment dispersion) or a surfactant (for surfactant-dispersed pigment dispersion) are fully mixed by using a known disperser, such as ball mill, sand mill, attritor, roll mill, agitator mill, Henschel mixer, colloid mill, ultrasonic homogenizer, jet mill or angmill. For preparing a dispersion of a surface-treated pigment, the surface-treated pigment and water are fully mixed by using any of the foregoing dispersers. In any case, a water-soluble organic solvent, a neutralizer, and any other additives may be optionally added. Beneficially, dispersion is continued until the particle size of the pigment is reduced to an average particle size in the range of 20 nm to 500 nm, preferably in the range of 50 nm to 200 nm, from the viewpoint of ensuring that the pigment is stably dispersed in water.

2. 1. 2. Water

The aqueous ink composition used in the present embodiment contains water. The water is a dominant medium of the ink composition and is evaporated by drying. Preferably, the water is pure water or ultra-pure water from which ionic impurities have been removed as much as possible. Examples of such water include ion exchanged water, ultrafiltered water, reverse osmosis water, and distilled water. Sterile water prepared by, for example, UV irradiation or addition of hydrogen peroxide may be used. Sterile water can reduce the occurrence of mold or bacteria and the use thereof is advantageous for storing the aqueous ink composition for a long time.

The water content may be 40% by mass or more and is preferably 50% by mass or more, such as 60% by mass or more or 70% by mass or more, relative to the total mass of the aqueous ink composition. When the water content is 40% by mass or more, the aqueous ink composition has a relatively low viscosity. The upper limit of the water content may be 90% by mass or less and is preferably 85% by mass or less, more preferably 80% by mass or less, relative to the total mass of the aqueous ink composition.

2. 1. 3. Resin

The aqueous ink composition used in the present embodiment contains a water-soluble and/or a water-insoluble resin component. The resin component solidifies the ink and firmly fixes the solidified ink to the recording medium. The resin may be dissolved or dispersed in the aqueous ink composition. If the resin is dissolved, the above described resin dispersant used for dispersing the pigment of the aqueous ink composition may be used. If the resin is in a dispersion, fine particles of a resin that is insoluble or poorly soluble in the liquid medium of the ink composition are dispersed in the liquid medium to form an emulsion or a suspension.

Examples of the resin includes polyacrylic esters and copolymers thereof; polymethacrylic esters and copolymers thereof; polyacrylonitriles and copolymers thereof; polycyanoacrylate, polyacrylamide, polyacrylic acid, polymethacrylic acid, polyethylene, polypropylene, polybutene, polyisobutylene, polystyrene, and copolymers thereof; petroleum resin; chromane-indene resin; terpene resin; polyvinyl acetates and copolymers thereof; polyvinyl alcohol; polyvinyl acetal; polyvinyl ether; polyvinyl chlorides and copolymers thereof; polyvinylidene chloride; fluororesin; fluorine rubber; polyvinyl carbazole; polyvinyl pyrrolidones and copolymers thereof; polyvinyl pyridine; polyvinyl imidazole; polybutadienes and copolymers thereof; polychloroprene; polyisoprene; and natural resins, in addition to the above-cited resins used as the resin dispersant. Preferably, the molecule of the resin has a structure having both a hydrophobic site and a hydrophilic site.

The resin may be used in a form of fine particles. In order to obtain fine particles of the resin, any of the following methods may be used. Two or more of the methods may be combined if necessary. A polymerization catalyst (polymerization initiator) and a dispersant may be mixed into a monomer that can form a desired resin, and the mixture is subjected to polymerization (emulsion polymerization). A resin having a hydrophilic site may be dissolved in a water-soluble organic solvent, and after mixing the solution with water, the water-soluble organic solvent is removed by, for example, evaporation. A resin may be dissolved in a water-insoluble organic solvent, and the solution and a dispersant are mixed into water. Any of these methods can be appropriately selected according to the type and the properties of the resin to be used. Examples of the dispersant used for dispersing the resin include, but not limited to, anionic surfactants, such as sodium dodecylbenzenesulfonate, sodium lauryl phosphate, and polyoxyethylene alkyl ether ammonium sulfate; and nonionic polyoxyethylene alkyl ester, polyoxyethylene sorbitan fatty acid ester, and polyoxyethylene alkylphenyl ether. These dispersants may be used singly or in combination.

The resin in the form of fine particles (in an emulsion or a suspension) may be prepared from known materials by a known method. For example, resin particles disclosed in JP-B-62-1426, JP-A-3-56573, JP-A-3-79678, JP-A-3-160068, or JP-A-4-18462 may be used. Commercially available resin emulsions or suspensions may be used, and examples thereof include Micro Gel E-1002 and Micro Gel E-5002 (each produced by Nippon Paint), VONCOAT 4001 and VONCOAT 5454 (each produced by DIC), SAE 1014 (produced by Nippon Zeon), Saivinol SK-200 (produced by Saiden Chemical Industry), and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (each produced by BASF).

If the resin is used in the form of fine particles, the resin may have an average particle size in the range of 5 nm to 400 nm, preferably in the range of 50 nm to 200 nm, from the viewpoint of ensuring the storage stability and the ejection stability of the ink composition.

The resin may have a glass transition temperature in the range of −20° C. to 100° C., preferably in the range of −10° C. to 80° C.

The resin content (in terms of solids content) in the ink composition may be in the range of 0.1% by mass to 15% by mass, preferably in the range of 0.5% to 10% by mass, relative to the total mass of the ink composition. When the resin includes such a content, the aqueous ink composition can be solidified and fixed to even plastic recording media.

2. 1. 4. Water-Soluble Organic Solvent

The aqueous ink composition used in the present embodiment contains an water-soluble organic solvent. The water-soluble organic solvent enhances the adhesion of the ink composition to non-absorbent recording media and keeps the head of the ink jet recording apparatus from drying.

Example of the water-soluble organic solvent include, but are not limited to, 1,2-alkanediols and other polyhydric alcohols, pyrrolidone derivatives, and glycol ethers. Other alkanediols and polyols may be used as the water-soluble organic solvent.

Exemplary 1,2-alkanediols include 1,2-propanediol, 1,2-butanediol, 1,2-pentanediol, 1,2-hexanediol, and 1,2-octanediol. Since 1,2-alkanediols are superior in increasing the wettability of the aqueous ink composition on the recording medium. If the aqueous ink composition contains a 1,2-alkanediol, the content thereof is preferably in the range of 1% by mass to 20% by mass relative to the total mass of the ink composition.

Examples of the polyhydric alcohol other than 1,2-alkanediols include ethylene glycol, diethylene glycol, propylene glycol, dipropylene glycol, 1,3-propanediol, 1,4-butanediol, 1,6-hexanediol, trimethylolpropane, and glycerin. If the aqueous ink composition contains a polyhydric alcohol, the content thereof may be in the range of 1% by mass to 20% by mass relative to the total mass of the aqueous ink composition.

Exemplary pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Pyrrolidone derivatives are suitable as a dissolving agent for the resin. If the aqueous ink composition contains a pyrrolidone derivative, the content thereof may be in the range of 1% by mass to 30% by mass relative to the total mass of the aqueous ink composition.

Exemplary glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These organic solvents may be used singly or in combination. The wettability of the aqueous ink composition on the recording medium can be controlled by using a glycol ether.

The alkanediol used as the water-soluble organic solvent may have a carbon number of 5 or more, and also, the carbon number of the alkanediol may be, but is not limited to, 10 or less, preferably 9 or less. As described above, any other alkanediol may be used without limitation to 1,2-alkanediols. Alkanediols are superior in increasing the wettability of the aqueous ink composition on the recording medium. If the aqueous ink composition contains an alkanediol, the content thereof may be in the range of 1% by mass to 20% by mass relative to the total mass of the aqueous ink composition.

Polyols that can be used as the water-soluble organic solvent include diols of an alkane having a carbon number of 4 or less, condensates of diols of an alkane having a carbon number of 4 or less, or trivalent or higher valent polyols of alkanes. Polyols may include 1,2-alkanediols of which the alkane has a carbon number of 4 or less. Polyols are superior in preventing the ink composition from drying in the nozzles. If the aqueous ink composition contains any of the polyols, the content thereof may be in the range of 1% by mass to 20% by mass relative to the total mass of the ink composition.

The water-soluble organic solvent content may be in, but is not limited to, the range of 1% by mass to 40% by mass, relative to the total mass of the aqueous ink composition. The lower limit thereof may be 3% by mass or more and is preferably 5% by mass or more, more preferably 10% by mass or more, still more preferably 20% by mass or more, further preferably 25% by mass or more, still further preferably 30% by mass or more. The upper limit thereof is may be 35% or less.

Beneficially, the aqueous ink composition contains a water-soluble organic solvent having a normal boiling point in the range of 150° C. to 280° C. Also, the content of a water-soluble organic solvent having a normal boiling point of more than 280° C. in the aqueous ink composition is desirably 3% by mass or less. Such an aqueous ink composition can dry easily. Accordingly, the resulting recorded article is unlikely to be sticky and is superior in fastness to rubbing.

At least one of alkanediols and alkylene glycol monoether derivatives may be used as the water-soluble organic solvent having a normal boiling point in the range of 150° C. to 280° C. More preferably, the normal boiling point of the water-soluble organic solvent is 250° C. or less, such as 230° C. or less. Also, the content of the water-soluble organic solvent having a normal boiling point of 250° C. or less is preferably 20% by mass or more, more preferably 25% by mass or more, and still more preferably 30% by mass or more.

Organic solvents having a normal boiling point of more than 280° C. can absorb water from the ink composition, increasing the viscosity of the ink composition around the ink jet head. Consequently, the ejection stability of the ink jet head can be reduced.

Glycerin is one of the water-soluble organic solvents having a boiling point of more than 280° C. Aqueous ink compositions containing a hygroscopic organic solvent having a high boiling point, such as glycerin, are likely to clog the head and to cause the capping device to fail to operate properly. In addition, glycerin is not antiseptic and is likely to cause mold and bacteria to grow. It is desirable that the ink composition do not contain glycerin.

Accordingly, the content of the water-soluble organic solvent having a normal boiling point of more than 280° C. is desirably 2% by mass or less, preferably 1% by mass or less, more preferably 0.5% by mass or less, still more preferably 0.1% by mass or less, and is further preferably 0.05% by mass or less.

2. 1. 5. Surfactant

In an embodiment, the aqueous ink composition may contain a surfactant. The surfactant can reduce the surface tension to increase the wettability of the ink composition on the recording medium. Among surfactants, acetylene glycol-based surfactants, silicone surfactants, and fluorosurfactants are beneficial.

Examples of the acetylene glycol-based surfactant include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D and OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each produced by Nissin Chemical Industry); and ACETYLENOL series E00, E00P, E40, and E100 (each produced by Kawaken Fine Chemicals).

The silicone surfactant that can be used may be, but is not limited to, a polysiloxane-based compound. For example, a polyether-modified organosiloxane may be used as the polysiloxane-based compound. Polyether-modified organosiloxanes are commercially available, and examples thereof include BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

An example of preferred fluorosurfactants may be a fluorine-modified polymer, such as BYK-340 (produced by BYK).

If the aqueous ink composition contains a surfactant, the content thereof may be in the range of 0.1% by mass to 2.5% by mass relative to the total mass of the aqueous ink composition.

2. 1. 6. Other Constituents

In an embodiment, the ink composition may optionally contain a pH adjuster, a polyolefin wax, a preservative or a fungicide, a rust preventive, a chelating agent, and other additives. These ingredients can improve the characteristics of the ink composition.

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

The polyolefin wax may be produced from olefins, such as ethylene, propylene, or butylene, or an olefin derivative or an olefin copolymer, and examples of the polyolefin wax include polyethylene waxes, polypropylene waxes, and polybutylene waxes. Polyolefin waxes are commercially available, and examples thereof include NOPCOTE PEM 17 (produced by San Nopco), CHEMIPEARL W4005 (produced by Mitsui Chemicals), and AQUACER 515 and AQUACER 593 (each produced by BYK).

The polyolefin wax in the ink composition increases the lubricity of the image formed on an non-ink-absorbent or low-ink-absorbent recording medium when the image comes into physical contact, and also increases the rub fastness of the image. The polyolefin wax content in the aqueous ink composition may be in the range of 0.01% by mass to 10% by mass and is preferably in the range of 0.05% by mass to 1% by mass. When the polyolefin wax content is in such a range, the above-mentioned advantageous effects can be satisfactorily produced.

Examples of the preservative or fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives or fungicides include Proxel XL2 and Proxel GXL (each product name, produced by Avecia), and Denicide CSA and NS-500W (each product name, produced by Nagase Chemtex).

Benzotriazole or the like may be used as a rust preventive.

Examples of the chelating agent include ethylenediaminetetraacetic acid salts thereof, such as disodium dihydrogen ethylenediaminetetraacetate.

2. 1. 7. Properties of the Aqueous Ink Composition

Beneficially, the aqueous ink composition used in the present embodiment has a surface tension at 20° C. in the range of 20 mN/m to 40 mN/m, preferably in the range of 20 mN/m to 35 mN/m, from the viewpoint of the balance between the quality of images and the reliability of the ink composition as an ink jet ink. The surface tension may be determined by measuring the ink composition wetting a platinum plate at 20° C. with, for example, an automatic surface tensiometer CBVP-Z (product name, manufactured by Kyowa Interface Science).

Also, from the same viewpoint as above, the aqueous ink composition may have a viscosity in the range of 3 mPa·s to 10 mPa·s, preferably in the range of 3 mPa·s to 8 mPa·s, at 20° C. The viscosity may be measured at 20° C. with a viscoelasticity meter MCR-300 (product name, manufactured by Pysica).

2. 2. Solvent-Based Ink Composition

The solvent-based ink composition used in the recording method of the present embodiment contains a coloring material and an organic solvent.

The solvent-based ink composition mentioned herein refers to a composition containing an organic solvent or the like as a dominant solvent without using water as a dominant solvent. The water content in the solvent-based ink composition may be 5% by mass or less and is preferably 3% by mass or less, more preferably 2% by mass or less, still more preferably 1% by mass or less, further preferably 0.5% by mass or less, relative to the total mass of the ink composition. The content of the organic solvent or the like is may be 50% by mass or more and is preferably 70% by mass or more, more preferably 80% by mass or more, still more preferably 90% by mass or more, relative to the total mass of the ink composition. The solvent-based ink composition, however, may contain water unintentionally inevitably added during the process of preparing the composition.

2. 2. 1. Coloring Material

The solvent-based ink composition used in the present embodiment contains a coloring material. The coloring material may be selected from among known coloring materials conventionally used in solvent-based inks, including inorganic pigments, organic pigments, and dyes. A coloring material may be used alone, or some coloring materials may be combined. Exemplary organic pigments include azo pigments, such as azo lake, insoluble azo pigments, condensed azo pigments, and chelate azo pigments; polycyclic pigments, such as phthalocyanine pigments, perylene and perylene pigments, anthraquinone pigments, quinacridone pigments, dioxazine pigments, thioindigo pigments, isoindolinone pigments, and quinophthalone pigments; dye lakes, such as basic dye lakes and acid dye lakes; nitro pigments; nitroso pigments; aniline black; and daylight fluorescent pigments. Exemplary inorganic pigments include carbon blacks, titanium dioxide, silica, and alumina. Exemplary dyes include azo dyes, metal complex dyes, naphthol dyes, anthraquinone dyes, indigo dyes, carbonium dyes, quinonimine dyes, xanthine dyes, cyanine dyes, quinone dyes, nitro dyes, nitroso dyes, benzoquinone dyes, naphthoquinone dyes, phthalocyanine dyes, and metal phthalocyanine dyes. Oil-soluble dyes are advantageous. A pigment or a dye may be used alone, or some pigments or dyes may be used in combination. From the viewpoint of weather resistance, pigments are advantageous. If a pigment is used, the primary particle size thereof may be 50 nm to 500 nm and is preferably 50 nm to 200 nm.

The coloring material content, which is appropriately set as desired without particular limitation, is generally in the range of 0.1% by mass to 10% by mass and is preferably 0.5% by mass to 8% by mass, more preferably 1% by mass to 6% by mass, relative to the total mass of the aqueous ink composition. When the coloring material content is in such a range, the ink composition exhibits good color developability and forms weather-resistant images.

If a pigment is used as the coloring material, a pigment dispersant may be added. The pigment dispersant may be selected from among dispersants used in ordinary solvent-based inks, particularly in solvent-based inks for ink jet recording.

Dispersants that can function effectively when used in an organic solvent having a solubility parameter of 8 to 11 are advantageous. Such a dispersant is commercially available, and examples thereof include: polyester polymers such as Hinoact series KF1-M, T-6000, T-7000, T-8000, T-8350P, and T-8000E (each produced by Kawaken Fine Chemicals);

Solsperse series 20000, 24000, 32000, 32500, 33500, 34000, 35200, and 37500 (each produced by LUBRIZOL); Disperbyk series 161, 162, 163, 164, 166, 180, 190, 191, 192, 2091, and 2095 (each produced by BYK); FLOWLEN series DOPA-17, DOPA-22, DOPA-33, and G-700 (each produced by Kyoeisha Chemical); AJISPER series PB 821 and PB 711 (each produced by Ajinomoto Fine-Techno); and LP 4010, LP 4050, LP 4055, and POLYMER series 400, 401, 402, 403, 450, 451, and 453 (each produced by EFKA Chemicals). The dispersant content, in the case of using a pigment, may be appropriately set according to the pigment and is preferably in the range of 5 parts by mass to 200 parts by mass, more preferably 30 parts by mass to 120 parts by mass, relative to 100 parts by mass of the pigment in the ink composition.

2. 2. 2. Organic Solvent

The solvent-based ink composition used in the present embodiment contains an organic solvent. Examples of the organic solvent include, but are not limited to, alkylene glycol monoether-based solvents, alkylene glycol diether-based solvents, and lactones (cyclic esters).

Alkylene Glycol Monoether-Based Solvent

Alkylene glycol monoether-based solvents represented by the following general formula (1) are beneficial:

$$R^1O-(R^2O)_m-OH \quad (1)$$

wherein $R^1$ represents an alkyl group having a carbon number in the range of 1 to 4, $R^2$ represents an alkylene group having a carbon number in the range of 2 to 4, and m represents an integer in the range of 1 to 7.

The alkyl group $R^1$ having a carbon number in the range of 1 to 4 may be linear or branched, and examples thereof include methyl, ethyl, n-propyl, isopropyl, n-butyl, sec-butyl, isobutyl, and tert-butyl.

Examples of the alkylene group having a carbon number in the range of 2 to 4 represented by $R^2$ in general formula (1) include ethylene, n-propylene, isopropylene, and butylene. From the viewpoint of reducing damage to members or components, it is more advantageous that m and the carbon number of the alkyl group $R^1$ be larger. Preferably, m is an integer of 3 to 6.

Examples of the solvent represented by general formula (1) include ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, and dipropylene glycol monoethyl ether. These compounds may be used singly or in combination.

Alkylene Glycol Diether-Based Solvent

The alkylene glycol monoether-based solvent that may be used in the present embodiment may be represented by the following general formula (2):

$$R^3O-(R^4O)_n-R^5 \quad (2)$$

wherein $R^3$ and $R^5$ each represent an alkyl group having a carbon number in the range of 1 to 4, $R^4$ represents an alkylene group having a carbon number in the range of 2 to 4, and n represents an integer in the range of 1 to 7.

Alkyl groups $R^3$ and $R^5$ having a carbon number in the range of 1 to 4 may be linear or branched, and examples thereof include methyl, ethyl, n-propyl, isopropyl, n-butyl, sec-butyl, isobutyl, and tert-butyl.

Examples of the alkylene group having a carbon number in the range of 2 to 4 represented by $R^4$ in general formula (2) include ethylene, n-propylene, isopropylene, and butylene. From the viewpoint of reducing damage to members or components, it is more advantageous that n and the carbon numbers of alkyl groups $R^3$ and $R^5$ be larger. Preferably, n is an integer of 3 to 6.

Examples of the solvent represented by general formula (2) include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Alkylene glycol diethers may be used singly or in combination.

If any of the alkylene glycol ether-based solvents is used in the solvent-based ink composition, the content thereof may be 80% by mass or less and is preferably in the range of 30% by mass to 75% by mass, more preferably in the range of 40% by mass to 70% by mass, relative to the total mass of the solvent-based ink composition.

Lactone (Cyclic Ester)

The solvent-based ink composition used in the present embodiment may contain a lactone (cyclic ester) as an organic solvent. The lactone in the solvent-based ink composition can dissolve part of the recording surface (containing, for example, a vinyl chloride-based resin) of the recording medium, thus helping the ink composition to penetrate the recording medium. By helping the ink to penetrate the recording medium, the abrasion resistance (rub fastness) of the image recorded on the recording medium can be enhanced. More specifically, lactones are highly compatible with vinyl chloride-based resin and are accordingly likely to cause the components of the solvent-based ink composition to infiltrate into the recording surface. Since lactones have such a function, the ink composition containing a lactone is expected to form images that can exhibit a high rub fastness even under severe conditions, such as outdoor environment.

Lactones have a molecular structure formed by an intramolecular dehydration condensation of a compound having a hydroxy group and a carboxy group between the hydroxy group and the carboxy group. A cyclic ester has a heterocycle containing two or more carbon atoms and one oxygen atom, in which a carbonyl group is located adjacent to the oxygen.

Lactones having a simple structure include β-propiolactone, β-butyrolactone, γ-butyrolactone, γ-valerolactone, γ-caprolactone, σ-valerolactone, and ε-caprolactone. The number of members of the lactone is not particularly limited, and the members of the lactone may have any side chain. Lactones may be used singly or in combination.

From the viewpoint of further enhancing the rub fastness of the image formed with the solvent-based ink composition used in the present embodiment, 3-membered to 7-membered lactones are preferred, and 5-membered or 6-membered lactones are more preferred. In any case, it is desirable that the lactone do not have a side chain. Examples of such a lactone include β-butyrolactone, γ-butyrolactone, and γ-valerolactone. These lactones are compatible with polyvinyl chloride. If an ink composition containing any of these lactones is used for recording on a recording medium containing polyvinyl chloride, the rub fastness of the recorded image can be enhanced effectively.

If the solvent-based ink composition contains a lactone, the lactone content (total content, if a plurality of lactones are contained) may be in the range of 5% by mass to 50% by mass and is preferably in the range of 7% by mass to 30% by mass, more preferably in the range of 10% by mass to 20% by mass, relative to the total mass of the solvent-based ink composition.

Further Organic Solvent

The solvent-based ink composition used in the present embodiment may further contain one or more of the following organic solvents in addition to the above-described solvent.

The further organic solvent may be a polar organic solvent, and examples thereof include alcohols, such as methyl alcohol, ethyl alcohol, propyl alcohol, butyl alcohol, isopropyl alcohol, and fluoroalcohols; ketones, such as acetone, methyl ethyl ketone, and cyclohexanone; carboxylic acid esters, such as methyl acetate, ethyl acetate, propyl acetate, butyl acetate, methyl propionate, and ethyl propionate; ethers, such as diethyl ether, dipropyl ether, tetrahydrofuran, and dioxane; and polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane.

Other (poly)hydric alcohols may be used as the organic solvent, and examples thereof include dipropylene glycol, 1,2-butanediol, 1,2-pentanediol, 1,2-hexanediol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, and 2-methylpentane-2,4-diol.

The solvent-based ink composition may contain an amine, such as triethanolamine, tripropanolamine, tributanolamine, N,N-dimethyl-2-aminoethanol, N,N-diethyl-2-aminoethanol, and other hydroxylamines. These amines may be used singly or in combination.

Other examples of the further organic solvent include higher fatty acid esters, such as methyl laurate, isopropyl hexadecanoate (isopropyl palmitate), isopropyl myristate, methyl oleate, and ethyl oleate; dibasic acid diesters produced by diesterifying a dicarboxylic acid of an aliphatic hydrocarbon having a carbon number of 2 to 8 (the number of carbon atoms of the carboxy groups is not counted) with an alkyl group having a carbon number of 1 to 5; and alkylamides, such as N,N-dimethyldecanamide, produced by amidating a monocarboxylic acid of an aliphatic hydrocarbon having a carbon number of 6 to 10 (the number of carbon atoms of the carboxy group is not counted, substituents on the nitrogen atom of the amide are each hydrogen or an alkyl group having a carbon number of 1 to 4).

One or more of the above-cited further organic solvents may be added to the solvent-based ink composition in an appropriate proportion so that the total solvent content can be 80% by mass or more relative to the total mass of the ink composition. The content of the further organic solvent may be in the range of 0.05% by mass to 5% by mass and is preferably in the range of 0.1% by mass to 3% by mass, relative to the total mass of the solvent-based ink composition.

One or more of the above-cited further organic solvents may be added to the solvent-based ink composition in an appropriate proportion.

2. 2. 3. Fixing Resin

The solvent-based ink composition used in the present embodiment may contain a fixing resin to fix the coloring material to the recording medium.

Examples of the fixing resin include acrylic resins, styrene acrylic resins, rosin-modified resins, phenol resins, terpene resins, polyester resins, polyamide resins, epoxy resins, vinyl acetate resins, vinyl chloride resins, cellulose acetate butyrate and other textile fabric resins, and vinyl toluene-α-methylstyrene copolymer resins. Preferably, the fixing resin is at least one of the acrylic resins and vinyl chloride resins, more preferably vinyl chloride resins, is selected from among those resins. The fixing resin can increase the fixability of the ink composition to the recording medium and the fastness to rubbing of the resulting recorded article.

The solids content of the fixing resin in the solvent-based ink composition may be in the range of 0.05% by mass to 15% by mass and is preferably in the range of 0.1% by mass to 10% by mass, more preferably 1% by mass to 5% by mass. When the fixing resin content is in such a range, the ink composition can exhibit satisfactory fixability to the recording medium.

Acrylic Resin

Exemplary acrylic resins include (meth)acrylic monomers and copolymer resins thereof with other monomers, such as poly(meth)acrylic acid, poly(methyl (meth)acrylate), poly(ethyl meth(acrylate)), (meth)acrylic acid-(meth)acrylic ester copolymer resin, styrene-(meth)acrylic copolymer resin, ethylene-(meth)acrylic acid copolymer resin, ethylene alkyl (meth)acrylate resin, and ethylene-(meth)acrylic ester copolymer resin. The resins may be used singly or in combination.

A commercially available acrylic resin may be used, and example thereof include Acrypet MF (acrylic resin produced by Mitsubishi Rayon), SUMIPEX LG (acrylic resin produced by Sumitomo Chemical), Paraloid B Series (acrylic resin produced by Rohm and Haas Company), and Parapet G-1000P (acrylic resin produced by Kuraray). (Meth)acrylic acid refers to both acrylic acid and methacrylic acid, and (meth)acrylate refers to an acrylate and the corresponding methacrylate.

Vinyl Chloride Resin

Exemplary vinyl chloride resins include copolymers of vinyl chloride and other monomers such as vinyl acetate, vinylidene chloride, acrylic acid, maleic acid, or vinyl alcohols. Among these, copolymers containing constitutional units derived from vinyl chloride and vinyl acetate copolymer) are preferred. A vinyl chloride-vinyl acetate copolymer having a glass transition temperature of 60° C. to 80° C. is more preferred.

The vinyl chloride-vinyl acetate copolymer may be produced by a conventional process, such as suspension polymerization. More specifically, a polymerization vessel is charged with water, a dispersant and a polymerization initiator. After degassing, vinyl chloride and vinyl acetate are added to the vessel under pressure for suspension polymerization. Alternatively, the suspension polymerization reaction may be started when vinyl acetate and part of the vinyl chloride are placed into the vessel under pressure, and then the rest of the vinyl chloride is added under pressure during the reaction.

Preferably, the vinyl chloride-vinyl acetate copolymer contains 70% by mass to 90% by mass of vinyl chloride unit.

When it is in this range, the vinyl chloride-vinyl acetate copolymer is dissolved stably in the ink composition. Accordingly, the ink composition can be stably stored for a long time. In addition, such an ink composition can be stably ejected and satisfactorily fixed to the recording medium.

The vinyl chloride-vinyl acetate copolymer may optionally have a further constitutional unit in addition to the vinyl chloride unit and the vinyl acetate unit. Examples of the further constitutional unit include a carboxylic acid unit, a vinyl alcohol unit, and a hydroxyalkyl acrylate unit. A vinyl alcohol unit is preferred. The vinyl chloride-vinyl acetate copolymer having a further constitutional unit is produced by using a monomer corresponding to the further constitutional unit. Exemplary monomers that can be used for forming the carboxylic acid unit include maleic acid, itaconic acid, maleic anhydride, itaconic anhydride, acrylic acid, and methacrylic acid. Exemplary monomers that can be used for forming the hydroxyalkyl acrylate unit include hydroxyethyl (meth)acrylate and hydroxyethyl vinyl ether. Although the amount of such a monomer is not particularly limited as long as the monomer does not adversely affect the effects of the idea of the present disclosure, the monomer may be copolymerized, for example, in a proportion of 15% by mass or less to the total mass of all monomers.

A commercially available vinyl chloride-vinyl acetate copolymer may be used, and exampled thereof include Solbin CN, Solbin CNL, Solbin C5R, Solbin TA5R, Solbin CL, and Solbin CLL (each produced by Nissin Chemical Industry); and Kanevinyl HM515 (produced by Kaneka).

The average polymerization degree of the vinyl chloride-vinyl acetate copolymer is preferably, but is not limited to, 150 to 1100, more preferably 200 to 750. When it is in this range, the vinyl chloride-vinyl acetate copolymer is dissolved stably in the solvent-based ink composition used in the present embodiment. Accordingly, the ink composition can be stably stored for a long time. In addition, such an ink composition can be stably ejected and satisfactorily fixed to the recording medium. The average polymerization degree is determined by measurement of specific viscosity and calculation using the specific viscosity according to the calculation of average polymerization degree specified in JIS K 6720-2.

The number average molecular weight of the vinyl chloride-vinyl acetate copolymer is preferably, but is not limited to, 10000 to 50000, more preferably 12000 to 42000. The number average molecular weight may be measured by gel permeation chromatography (GPC) as a relative value in terms of polystyrene-equivalent.

2. 2. 4. Surfactant

The solvent-based ink composition used in the present embodiment may contain a surfactant, such as a silicone surfactant, a fluorosurfactant, or a polyoxyethylene derivative acting as a nonionic surfactant, from the viewpoint of reducing the surface tension and thus increasing the wettability on the recording medium.

Preferred examples of the silicone surfactant include polyester-modified silicones and polyether-modified silicones. Examples of such a silicone surfactant include BYK-315, BYK-315N, BYK-347, BYK-348, BYK-UV 3500, BYK-UV 3510, BYK-UV 3530, and BYK-UV 3570 (each produced by BYK).

An example of preferred fluorosurfactants may be a fluorine-modified polymer, such as BYK-340 (produced by BYK).

An example of preferred polyoxyethylene derivatives may be an acetylene glycol-based surfactant. Examples of the acetylene glycol-based surfactant include Surfynol series 82, 104, 465, 485, and TG (each produced by Air Products); Olfine series STG and E1010 (each produced by Nissin Chemical Industry); Nissan Nonion series: A-10R and A-13R (each produced by NOF Corporation); FLOWLEN series: TG-740W and D-90 (each produced by Kyoeisha Chemical); and NOIGEN CX-100 (produced by Dai-ichi Kogyo Seiyaku).

The surfactant content in the solvent-based ink is preferably in the range of 0.05% by mass to 3% by mass, more preferably 0.5% by mass to 2% by mass, and still more preferably 1% by mass to 1.5% by mass.

2. 2. 5. Other Constituents

The solvent-based ink composition used in the present embodiment may optionally contain further constituents, such a pH adjuster, an ethylenediaminetetraacetic acid salt (EDTA salt) or any other chelating agent, a preservative or fungicide, and a rust preventive, to impart desired properties.

2. 2. 6. Preparation of Solvent-Based Ink Composition

The solvent-based ink composition used in the present embodiment is prepared by mixing the above-described ingredients in an arbitrary order and optionally removing impurities by, for example, filtration. For mixing the ingredients, for example, the ingredients may be added one after another into a container equipped with a stirring device, such as a mechanical stirrer or a magnetic stirrer, and the contents of the container are stirred. Filtration may be performed as required by, for example, centrifugal filtration or using a filter.

2. 2. 7. Physical Properties of Solvent-Based Ink Composition

Preferably, the solvent-based ink composition used in the present embodiment has a surface tension at 20° C. in the range of 20 mN/m to 50 mN/m, more preferably in the range of 25 mN/m to 40 mN/m, from the viewpoint of the balance between the quality of recorded articles and the reliability of the ink composition in terms of being used as an ink jet recording ink. The surface tension can be determined by measuring the ink wetting a platinum plate at 20° C. with an automatic surface tensiometer CBVP-Z (manufactured by Kyowa Interface Science).

Also, from the same viewpoint as above, the solvent-based ink composition preferably has a viscosity in the range of 2 mPa·s to 15 mPa·s, more preferably in the range of 2 mPa·s to 10 mPa·s, at 20° C. The viscosity can be measured with a viscoelasticity meter MCR-300 (manufactured by Pysica) by increasing the shear rate to 10 to 1000 at 20° C. and reading the indicated value of the meter at a shear rate of 200.

3. Reaction Liquid

In an embodiment of the recording method of the disclosure, a reaction liquid may be applied to the recording medium as described herein below. This reaction liquid will now be described. The reaction liquid contains a flocculant capable of forming an aggerate of one or more components of the ink composition, particularly aqueous ink composition. The function of the flocculant helps to form high-quality images.

3. 1. Flocculant

The reaction liquid used in an embodiment of the recording method contains a flocculant capable of forming an aggregate of one or more components of the ink composition. The flocculant in the reaction liquid reacts rapidly with the resin in the ink composition during recording. Thus, the dispersion of the coloring material and the resin is broken, and the coloring material and the resin form aggregates. The aggregates hinder the coloring material from penetrating the recording medium, thus improving the quality of recorded images.

The flocculant may be a multivalent metal salt, a cationic compound (cationic resin, cationic surfactant, or the like), or an organic acid. Such a flocculant may be used singly, or some flocculants may be used in combination. Beneficially, the flocculant is at least one selected from the group consisting of multivalent metal salts and organic acids because these compounds are highly reactive with the resin contained in the ink composition.

The multivalent metal salt may be a water-soluble compound composed of a divalent or higher-valent metal ion and an anion capable of binding to the metal ion. Examples of the multivalent metal ion include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO^{3-}$, $NO^{3-}$, $HCOO^-$, and $CH_3COO^-$. Calcium salts and magnesium salts are preferred in terms of stability of the reaction liquid and reactivity as the flocculant.

Examples of the organic acids include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, and derivatives or salts of these acids. Organic acids may be used singly or in combination.

Examples of the cationic resin include cationic urethane resins, cationic olefin resins, and cationic allyl amine resins.

Any known cationic urethane resin may be used. A commercially available cationic urethane resin may be used. Examples thereof include HYDRAN series CP-7010, CP-7020, CP-7030, CP-7040, CP-7050, CP-7060, and CP-7610 (each produced by DIC); SUPERFLEX series 600, 610, 620, 630, 640, and 650 (each produced by Dai-ichi Kogyo Seiyaku); and Urethane Emulsions WBR-2120C and WBR-2122C (each produced by Taisei Fine Chemical).

Cationic olefin resins have a skeleton containing an olefin, such as ethylene or propylene. Any known olefin resin may be used as the flocculant. The cationic olefin resin may be dispersed in water or an organic solvent, thus being in the form of an emulsion. A commercially available cationic olefin resin may be used, and examples thereof include Arrowbase series CB-1200 and CD-1200 (produced by Unitika).

A cationic allyl amine resin selected from the known cationic allyl amine resins may be used as the flocculant, and examples thereof include polyallylamine hydrochloride, polyallylamine amidosulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymer, diallylmethylethylammonium ethylsulfate-sulfur dioxide copolymer, methyldiallylamine hydrochloride-sulfur dioxide copolymer, diallyldimethylammonium chloride-sulfur dioxide copolymer, and diallyldimethylammonium chloride-acrylamide copolymer. Some cationic allyl amine resins are commercially available, and examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (each produced by Nittobo Medical); and Hymo Neo-600, Himoloc series Q-101, Q-311, and Q-501, and Himax series SC-505 and SC-505 (each produced by Hymo).

Cationic surfactants include: primary, secondary, or tertiary amine salts including alkyl amine salts, dialkyl amine salts, and aliphatic amine salts; quaternary ammonium salts, such as benzalkonium salts and other quaternary alkyl ammonium salts, alkyl pyridinium salts, sulfonium salts, phosphonium salts, onium salts, and imidazolinium salts. More specifically, examples of the cationic surfactants include hydrochlorides or acetates of laurylamine, palm amine, and rosin amine, lauryltrimethylammonium chloride, cetyltrimethylammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

The solubility of the flocculant in water may be 600 g/L or less. In an embodiment, a maintenance liquid may be used for maintaining the ink jet head. In this instance, even if the flocculant has a low solubility in water and therefor tends to be precipitated due to the dried nozzle surface, ejection failure at the nozzle surface caused by the reaction liquid can be reduced. Even if the solubility of the flocculant in water is 500 g/L or less, the reaction liquid can function effectively in the method of the disclosure. Furthermore, even if the solubility is 400 g/L or less or 300 g/L or less, the reaction liquid can function effectively.

The concentration of the flocculant in the reaction liquid may be 0.03 mol/kg or more. Also, it may be in the range of 0.1 mol/kg to 1.5 mol/kg, or in the range of 0.2 mol/kg to 0.9 mol/kg. The flocculant content in the reaction liquid may be in the range of 0.1% by mass to 25% by mass, 0.2% by mass to 20% by mass, or 0.3% by mass to 10% by mass, relative to the total mass of the reaction liquid.

Whether or not the flocculant has reacted with the resin in the ink composition can be determined, for example, according to whether or not the resin particles have aggregated in a resin aggregation test. More specifically, in the resin aggregation test, a solution of a flocculant with a predetermined concentration is dropped into a resin liquid containing a resin with a predetermined concentration while the mixture is stirred, and it is visually checked whether precipitation occurs in the resulting mixture.

3. 2. Water

Beneficially, the reaction liquid used in an embodiment contains water as a dominant solvent. The water is evaporated by drying after the reaction liquid has been applied onto the recording medium. Preferably, the water is pure water or ultra-pure water from which ionic impurities have been removed as much as possible. Examples of such water include ion exchanged water, ultrafiltered water, reverse osmosis water, and distilled water. Sterile water prepared by, for example, UV irradiation or addition of hydrogen peroxide is preferred. The use of sterile water can prevent, for a long time, the occurrence of mold or bacteria in the reaction liquid. The water content in the reaction liquid may be 40% by mass or more relative to the total mass of the reaction liquid and is preferably 50% by mass or more, still more preferably 55% by mass or more, such as 65% by mass or more.

3. 3. Organic Solvent

The reaction liquid may contain an organic solvent. By adding an organic solvent, the wettability of the reaction liquid on the recording medium can be increased. The same organic solvent as used in the ink composition may be used. The organic solvent content may be, but is not limited to, 1% by mass to 40% by mass, preferably 5% by mass to 30% by mass, relative to the total mass of the reaction liquid.

The reaction liquid may contain a water-soluble organic solvent having a normal boiling point of 280° C. or less as an organic solvent, while the content of a water-soluble organic solvent having a normal boiling point of more than 280° C. is 3% may mass or less, preferably 1% by mass or less, more preferably 0.5% by mass or less. Such a reaction liquid can dry easily and rapidly. Accordingly, the resulting recorded article is unlikely to be sticky and superior in fastness to rubbing.

The water-soluble organic solvent having a normal boiling point of 280° C. or less may be at least one selected from among pyrrolidone derivatives, alkanediols, and alkylene glycol monoether derivatives. Preferably, the normal boiling point of the water-soluble organic solvent is 250° C. or less, more preferably 230° C. or less, and still more preferably 210° C. or less. Also, the content of the water-soluble organic solvent having a normal boiling point of 280° C. or less is preferably 5% by mass or more, more preferably 10% by mass or more, and still more preferably 15% by mass or more.

3. 4. Surfactant

The reaction liquid used in an embodiment of the present disclosure may contain a surfactant. By adding a surfactant, the surface tension of the reaction liquid can be reduced, and accordingly, the wettability of the reaction liquid on the recording medium can be increased. Among surfactants, acetylene glycol-based surfactants, silicone surfactants, and fluorosurfactants are beneficial. The same surfactant as used in the ink composition may be used. The surfactant content may be, but is not limited to, 0.1% by mass to 1.5% by mass relative to the total mass of the reaction liquid.

3. 5. Other Ingredients

The reaction liquid used in an embodiment of the present disclosure may optionally contain a pH adjuster, a preservative or a fungicide, a rust preventive, a chelating agent, and other additives.

3. 6. Physical Properties of Reaction Liquid

If the reaction liquid is applied by being ejected from an ink jet recording head, the surface tension of the reaction liquid at 20° C. is preferably in the range of 20 mN/m to 40 mN/m, more preferably in the range of 20 mN/m to 35 mN/m. The surface tension may be determined by measuring the reaction liquid wetting a platinum plate at 20° C. with, for example, an automatic surface tensiometer CBVP-Z (product name, manufactured by Kyowa Interface Science).

For ejecting the reaction liquid from an ink jet recording head, the viscosity of the reaction liquid at 20° C. is preferably in the range of 3 mPa·s to 10 mPa·s, more preferably in the range of 3 mPa·s to 8 mPa·s. The viscosity may be measured at 20° C. with a viscoelasticity meter MCR-300 (product name, manufactured by Pysica).

3. 7. Preparation of Reaction Liquid

The reaction liquid may be prepared by mixing and dispersing the above-described ingredients in an appropriate manner. After sufficiently stirring the mixture, foreign matter and coarse particles that can cause clogging are removed through a filter to yield a desired reaction liquid.

4. Recording Medium

In the present disclosure, any recording medium may be used without particular limitation. For example, the recording medium may be poorly absorbent or non-absorbent of ink. According to the recording method of the present embodiment that will be described herein below, the surface temperature of the recording medium is controlled so as to vary within a predetermined variation range during and after the ink composition has been applied to the recording medium, thereby preventing thermal expansion that causes the recording medium to change in dimensions. Also, by controlling the surface temperature of the recording medium to vary within a predetermined variation range, the ink is satisfactorily dried along the transport path. Consequently, the image quality and the rub fastness of resulting images are improved.

A recording medium that is poorly absorbent or non-absorbent of ink is hereinafter referred to as a low-ink-absorbent or non-ink-absorbent recording medium, and these refer to a recording medium that hardly absorbs ink or does not absorb ink. Quantitatively, the non-ink-absorbent or low-ink-absorbent recording medium exhibits a water absorption of 10 mL/m$^2$ or less for a period of 30 ms$^{1/2}$ from the beginning of contact with water, measured by Bristow's method. The Bristow's method is broadly used as a method for measuring liquid absorption for a short time, and Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000). An ink-absorbent recording medium refers to a recording medium that is not classified as a non-ink-absorbent or low-ink-absorbent recording medium.

The non-ink-absorbent recording medium may be a plastic film not provided with an ink-absorbing layer, or a medium including a paper sheet or any other base material coated with or bonded to a plastic film. The plastic mentioned here may be polyvinyl chloride, polyethylene terephthalate, polycarbonate, polystyrene, polyurethane, polyethylene, or polypropylene.

The low-ink-absorbent recording medium may be provided with a coating layer capable of receiving ink on the surface thereof. The low-ink-absorbent recording medium including a paper base material may be a book-printing paper, such as art paper, coated paper, or matte paper, and the low-ink-absorbent recording medium including a plastic base material may be a film of polyvinyl chloride, polyethylene terephthalate, polycarbonate, polystyrene, polyurethane, polyethylene, polypropylene, or the like coated with a hydrophilic polymer or a coating formed by applying silica or titanium particles together with a binder. The recording medium may be transparent.

The recording medium may have a release sheet. As will be described herein below, thermal expansion, which causes the recording medium to change in dimensions, is suppressed by controlling the surface temperature of the recording medium. Accordingly, even if the recording medium has a release sheet, a difference in volume expansion between the release sheet and the recording medium is minimized. Thus, the recording method of the present embodiment can produce recorded images having high images quality and/or high fastness to rubbing.

The recording medium with a release sheet may be a multilayer sheet including a polyvinyl chloride film (resin film), a release sheet of paper, and an adhesive between the resin film and the release sheet. Such a recording medium is widely used for advertisement signs or the like posted indoors and outdoors. In this instance, the polyvinyl chloride film side is used as the recording surface. A variety of images are recorded on the recording surface, and the release sheet on the opposite side of the recording medium is removed for pasting the film on a surface. Thus, film is used as an advertisement.

The recording medium with a release sheet may be a label sheet including a plurality of labels pasted on a strip of a release sheet (roll sheet) with a gap between each of the labels. The label, whose rear side is sticky, can be removed from the release sheet along a frame. Images can be printed in the regions corresponding to the labels on the strip of the release sheet.

The recording medium used in an embodiment may have a width of 350 mm or more. The recording method of the present embodiment can prevent deformation of the recording medium, even of a large recording medium having a width of 350 mm or more, by a temperature control without using a large oven, thus producing recorded images having high image quality and/or high fastness to rubbing. In general, the larger the width of the recording medium, the larger the thermal expansion and thermal deformation of the recording medium. Accordingly, a transport error is likely to increase, or a large kink is likely to occur in the recording medium. The recording method of the present embodiment is, however, advantageous for reducing deformation of the recording medium.

In the present embodiment, the lower limit of the width of the recording medium may be, but is not limited to, 300 mm or more and is preferably 350 mm or more, more preferably 700 mm or more, still more preferably 1000 mm or more or 1300 mm or more. In the present embodiment, the upper limit of the width of the recording medium may be, but is not limited to, 4000 mm or less and is preferably 3000 mm or less, more preferably 2000 mm or less. Recording media having a width in such a range are beneficial in enabling large-area recording and reducing deformation thereof.

Beneficially, the recording medium used in the present embodiment has a linear expansion coefficient ($10^{-5}$/° C.) in the range of 5 to 30, preferably in the range of 6 to 27, more preferably in the range of 7 to 25. Recording media having a linear expansion coefficient in such a range do not deform much. Beneficially, the recording medium used in the present embodiment has a Young's modulus in the range of 0.1 GPa to 5 GPa, preferably in the range of 0.5 GPa to 4 GPa, more preferably in the range of 1 GPa to 3 GPa. Recording media having a Young's modulus in such a range do not deform much.

5. Recording Method

Figure 2:
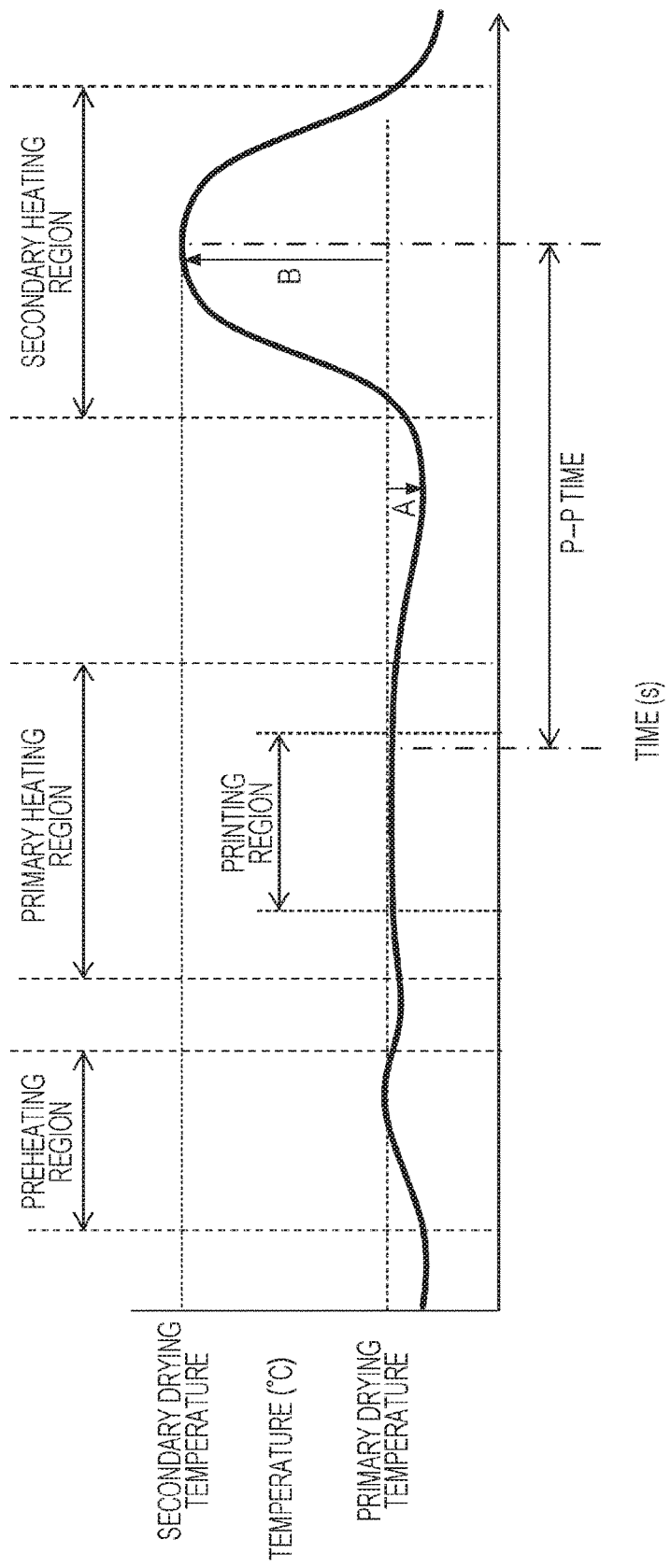
FIG. 2 is a graphical representation of changes in surface temperature of a recording medium in a recording method according to an embodiment of the invention.

The recording method according to an embodiment of the present disclosure is used for recording ink onto a recording medium by using the above-described recording apparatus. The recording method includes applying an ink composition onto a recording medium, primarily drying the recording medium by increasing the surface temperature of the recording medium to a primary drying temperature during the application of the ink composition, transporting the recording medium onto which the ink composition has been applied to a secondary drying device, and secondarily drying the recording medium by increasing the surface temperature of the recording medium to a secondary drying temperature with the secondary drying device. The variation in surface temperature of the recording medium from the primary drying temperature to the lowest temperature and the variation in surface temperature of the recording medium from the primary drying temperature to the highest temperature, in the period from the completion of the application of the ink composition to the completion of the secondary drying are −40% or more and 370% or less, respectively, relative to the primary drying temperature. The surface temperature of the recording medium is increased to the secondary drying temperature at an average rate of 7° C./s or less after the completion of the application of the ink composition. Major steps of the method will now be described. FIG. 2 is a graphical representation of changes in surface temperature of a recording medium in the recording method according to an embodiment of the present disclosure.

5. 1. Application of Ink Composition

The recording method of the present embodiment includes applying an ink composition onto a recording medium. More specifically, in the embodiment shown in FIG. 1, the ink composition is applied onto a portion of the roll sheet 1 by ejecting the ink composition from the recording head 11. Thus, an image is formed in a printing region of the roll sheet 1 or recording medium.

The lower limit of the maximum rate of application of the ink composition to the printing region of the recording medium may be 3 mg/inch$^2$ or more and is preferably 5 mg/inch$^2$ or more, more preferably 10 mg/inch$^2$ or more. The upper limit of the maximum rate of application of the ink composition to the printing region of the recording medium may be 20 mg/inch$^2$ or less and is preferably 15 mg/inch$^2$ or less, more preferably 13 mg/inch$^2$ or less. By applying the ink composition with such a rate, high-quality images can be formed. Even if the ink composition is applied with such a rate, the recording medium is prevented from being deformed by the following temperature control. Thus, the recording method of the present embodiment can produce recorded images having high image quality and/or high fastness to rubbing.

5. 2. Primary Drying

In the recording method of the present embodiment, for primary drying, the surface of the recording medium is heated to a primary drying temperature with a primary drying device (first heating section) 70 during the application of the ink composition. The primary drying reduces the bleeding of the ink composition attached to the roll sheet 1. The upper limit of the primary drying temperature of the surface of the recording medium heated for the primary drying may be 60° C. or less and is preferably 50° C. or less, more preferably 45° C. or less, such as 40° C. or less or 38° C. or less. The lower limit of the surface temperature of the recording medium heated for the primary drying may be 30° C. or more and is preferably 32° C. or more, more preferably 35° C. or less. When the recording medium is heated to a surface temperature of 60° C. or less, the ink jet head (which is very near the primary drying device 70) is not heated much, so that nozzle faults during printing can be reduced. Thus, the stability of continuous ejection tends to be improved. Also, when the recording medium is heated to a surface temperature of 30° C. or more, the ink composition exhibits an improved filling property for recording media, particularly non-absorbent recording media such as vinyl chloride media, thus improving image quality. The primary drying temperature (° C.) used herein refers to the highest temperature of the surface of the recording medium during the application of the ink composition.

5. 3. Transport of Recording Medium

In the recording method of the present embodiment, the recording medium onto which the ink composition has been applied is transported to a second heating section 80, or secondary drying device. Thus, a portion of the roll sheet 1, or recording medium, is transported to the secondary heating region. The transporting speed (mm/s) for transporting the recording medium is defined as the quotient of P-P length (mm) divided by P-P time (s), wherein P-P length (mm) refers to the distance from the point at which the application of the ink composition onto the recording medium is completed to the point at which the surface temperature reaches the secondary drying temperature, and P-P time (s) refers to the period of time from the completion of the application of the ink composition until the surface temperature of the recording medium reaches the second drying temperature. In view of print productivity, the transporting speed may be 1 mm/s or more and is preferably 5 mm/s or more, more preferably 10 mm/s or more.

5. 4. Secondary Drying

In the recording method of the present embodiment, the surface of the recording medium onto which the ink composition has been applied is heated to a secondary drying temperature with the second heating section 80, or the secondary drying device. Thus, the ink composition attached to the roll sheet 1 is more rapidly dried. The secondary drying temperature for the secondary drying may be higher than the primary drying temperature and is preferably higher than primary drying temperature by 10° C. or more, more preferably by 20° C. or more, still more preferably by 30° C. or more, such as 40° C. or more. Also, the secondary drying temperature is preferably higher than the primary drying temperature by 100° C. or less. When the secondary drying temperature is in such a range, the recording medium is prevented from being deformed, allowing the formation of recorded images having high image quality and/or high fastness to rubbing.

More specifically, the upper limit of the secondary drying temperature of the surface of the recording medium heated for the secondary drying may be 160° C. or less and is preferably 150° C. or less, more preferably 145° C. or less, such as 140° C. or less. The lower limit of the surface temperature of the recording medium heated for the secondary drying may be 50° C. or more and is preferably 60° C. or more, more preferably 70° C. or less. In the present embodiment, since the first heating section 70 and the second heating section 80 of the recording apparatus, that is, the primary heating region and the secondary heating region, are separate from each other, the secondary drying temperature of the second heating section 80 does not greatly affect the recording head 11 in the primary heating region, and accordingly does not greatly affect the ejection of the ink composition.

Also, in the recording method of the present embodiment, the variations in surface temperature of the recording medium from the primary drying temperature to the lowest temperature and to the highest temperature in the period from the completion of the application of the ink composition to the completion of the secondary drying is −40% or more and 370% or less, respectively, relative to the primary drying temperature, and the surface temperature of the recording medium is increased to the secondary drying temperature at an average rate of 7° C./s or less after the completion of the application of the ink composition. By controlling the surface temperature of the recording medium within such a variation range after the application of the ink composition, thermal expansion that causes the recording medium to change in dimensions can be prevented. Also, by controlling the surface temperature of the recording medium to vary within a predetermined variation range, the ink is satisfactorily dried along the transport path. Consequently, the image quality and/or the rub fastness of resulting images are improved. Furthermore, when the variations in surface temperature of the recording medium from the primary drying temperature to the lowest temperature and to the highest temperature are −40% or more and 370% or less, respectively, relative to the primary drying temperature, heat is not wasted, and energy is saved.

The secondary drying temperature (° C.) used herein refers to the highest surface temperature of the recording medium in the secondary heating region, and the lowest temperature (° C.) refers to the lowest surface temperature of the recording medium in the recording method of the present embodiment. The variation (%) to the lowest surface temperature is defined by {(lowest temperature−primary drying temperature)/primary drying temperature}×100. The variation (%) to the highest surface temperature is defined by {(secondary drying temperature−primary drying temperature)/primary drying temperature}×100. The average rate (° C./s) of temperature increase is defined by {(secondary drying temperature−primary drying temperature)/P-P time}×100. The variations in surface temperature to the lowest temperature and to the highest temperature are values rounded off to the nearest integer, and the average rate in temperature increase is the value rounded off to the second decimal place.

In FIG. 2, arrow A represents the difference in surface temperature of the recording medium to the lowest temperature after the primary drying. The variation in surface temperature to the lowest temperature is the rate of this difference relative to the primary drying temperature. Also, arrow B represents the difference in surface temperature of the recording medium to the highest temperature after the primary drying. The variation in surface temperature to the highest temperature is the rate of this difference relative to the primary drying temperature.

The lower limit of the variation to the lowest surface temperature may be −35% or more and is preferably −30% or more, more preferably −20% or more, still more preferably −10% or more, such as −7% or more. Also, the upper limit of the variation to the lowest surface temperature may be 0% or less and is preferably −3% or less, more preferably −5% or less, still more preferably −10% or less. It is advantageous that the variation to the lowest surface temperature be as large as possible, from the viewpoint of reducing dimensional changes. On the other hand, it is advantageous that the variation to the lowest surface temperature be as small as possible, from the viewpoint of simplifying the heating mechanism and the heat-retaining mechanism. The surface temperature of the recording medium varying to the lowest temperature is desirably higher than the surface temperature of the recording medium left on the transport route when the operation of the recording apparatus is stopped. In other words, it is desirable that the lowest temperature of the recording medium heated for the primary drying be higher (smaller in terms of temperature decreases) than the lowest temperature of the recording medium being transported on the transport route from which the heating mechanism and/or the heat-retaining mechanism is removed.

In the recording method of the present embodiment, the upper limit of the variation to the highest surface temperature may be 350% or less and is preferably 300% or less; the lower limit thereof may be 0% or more and is preferably 20% or more, more preferably 30% or more, still more preferably 50% or more, further preferably 70% or more, such as 100% or more, 150 or more, 200% or more, and 250% or more. While a smaller variation to the highest temperature is desirable in view of dimensional changes, a larger variation to the highest temperature is desirable in view of the rub fastness of the resulting images.

In the recording method of the present embodiment, also, the upper limit of the average rate of temperature increase may be 6° C./s or less and is preferably 5° C./s or less, more preferably 4° C./s or less. The lower limit of the average rate of temperature increase may be 0.2° C./s or more and is preferably 1° C./s or more, more preferably 2° C./s or more. When the average rate of temperature increase is in such a range, dimensional changes are reduced, and accordingly, the image quality and the rub fastness of the resulting images are improved.

Beneficially, the surface temperature of the recording medium may reach the secondary drying temperature within a period of 250 s, preferably within 100 s, more preferably within 80 s, still more preferably within 60 s, from the completion of the application of the ink composition. The lower limit of this period may be, but is not limited to, 5 s or more and is preferably 10 s or more. When the period of time from the completion of the ink composition until the surface temperature reaches the secondary drying temperature is within 250 s, the recording medium is further prevented from being deformed, allowing the formation of recorded images having high image quality and/or fastness to rubbing. The period within 250 s is beneficial in terms of designing the recording apparatus.

Beneficially, the surface temperature of the recording medium may reach the secondary drying temperature in a period of 60 s or less, preferably 50 s or less, more preferably 40 s or less, still more preferably 30 s or less, after the completion of the application of the ink composition. When the period of time until the surface temperature of the recording medium reaches the secondary drying temperature after the completion of the application of the ink composition is 60 s or less, the recording medium is prevented from being deformed, allowing the formation of recorded images having high image quality and/or fastness to rubbing.

5. 5. Other Operations

Preheating

In the recording method according to an embodiment of the disclosure, the ink composition may be preliminary heated (subjected to preheating) before the application of the ink composition. In this operation, the preheating section 60 heats a portion of the roll sheet 1, or recording medium. Since the recording medium is heated through this operation, the variation in surface temperature of the recording medium is reduced. Accordingly, the recording medium is prevented from being deformed, allowing the formation of recorded images having high image quality and/or fastness to rubbing. The preheating temperature may be the same as the primary drying temperature. More specifically, the upper limit of the surface of the recording medium heated by the preheating may be 60° C. or less and is preferably 50° C. or less, more preferably 45° C. or less, such as 40° C. or less or 38° C. or less. The lower limit of the surface temperature of the recording medium heated by the preheating may be 30° C. or more and is preferably 32° C. or more, more preferably 35° C. or less.

Application of Reaction Liquid

In an embodiment of the recording method of the disclosure, a reaction liquid may be applied to the portion of the recording medium in which images will be formed, before the application of the ink composition. By the application of the reaction liquid, image quality can be further improved.

The reaction liquid may be applied by, for example, spin coating, spray coating, gravure roll coating, reverse roll coating, bar coating, an ink jet method, or any other technique. Ink jet methods (ink jet recording methods) are beneficial. If an ink jet method is used, the reaction liquid is ejected onto the recording medium through nozzles of an ink jet recording head. The organic solvent contained in the reaction liquid tends to adjust the surface tension of the reaction liquid to a value suitable for ink jet recording, thus helping stable ejection of the reaction liquid through the nozzles.

After the application of the reaction liquid and before the application of the ink composition, the reaction liquid may be dried. In this instance, it is advantageous to dry the reaction liquid to the extent that the reaction liquid attached to the recording medium does not become sticky. The reaction liquid may be naturally dried, but is preferably dried by heating from the viewpoint of increasing drying speed.

In the present embodiment of the recording method, the surface temperature of the recording medium is controlled within a predetermined variation range after the application of the ink composition, thus preventing thermal expansion of the recording medium that causes dimensional changes. In particular, by controlling the surface temperature in the primary heating region so as not to decrease, and controlling the variation in temperature between the primary heating region and the secondary heating region so as not to increase, thermal expansion of the recording medium that causes dimensional changes is prevented. Also, by controlling the surface temperature of the recording medium so as to vary within a predetermined variation range, the ink is satisfactorily dried along the transport path. Consequently, the image quality and the rub fastness of resulting images are improved. Furthermore, when the variations in surface temperature of the recording medium from the primary drying temperature to the lowest temperature and to the highest temperature are −40% or more and 370% or less, respectively, relative to the primary drying temperature, heat is not wasted, and energy is saved.

6. Examples and Comparative Examples

The above-described embodiments of the disclosure will now be further described in detail with reference to Examples and Comparative Examples. However, the invention is not limited to the Examples disclosed below.

6. 1. Preparation of Solvent-Based Ink Compositions

Only the organic solvents shown in Table 1 were placed in a vessel with corresponding proportions shown in Table 1 and stirred to yield a mixed solvent. Predetermined amounts of Solsperse 37500 (produced by LUBRIZOL) and pigment were added to an aliquot of the mixed solvent, and the ingredients were sufficiently mixed for pre-dispersion by using a homogenizer and were then further mixed in a bead mill containing zirconia beads of 0.3 mm in diameter, thus preparing a pigment dispersion containing the pigment having an average particle size of 130 nm. The resin was added to another aliquot of the mixed solvent and stirred to yield a resin solution. The rest of the mixed solvent, the surfactant, and the resin solution were added to the pigment dispersion, followed by stirring for one hour. Then, the mixture was filtered through a 5 μm PTFE membrane filter to yield ink 1. All the values in Table 1 are represented by mass % (percent by mass).

TABLE 1

|  |  | Ink 1 |
|---|---|---|
| Coloring material | PB-15:3 | 4 |
| Pigment dispersant | Solsperse 37500 | 4 |
| Organic solvent | γ-Butyrolactone | 20 |
|  | DEGBME | 22 |
|  | DEGMEE | 40 |
| Surfactant | BYK 340 | 2 |
| Resin | HM 515 | 8 |
| Total |  | 100 |

The ingredients shown in Table 1 are as follows:
PB-15:3 (C. I. Pigment Blue 15:3 (copper phthalocyanine pigment)
Solsperse 37500 (resin dispersant, produced by LUBRIZOL)
γ-butyrolactone (normal boiling point: 204° C.)
DEGBME (diethylene glycol butyl methyl ether, normal boiling point: 212° C.)
DEGMEE (diethylene glycol methyl ethyl ether, normal boiling point: 176° C.)
BYK 340 (fluorosurfactant, produced by BYK)
HM 515 (vinyl chloride-vinyl acetate copolymer, Kanevinyl HM515 produced by Kaneka)

6. 2. Preparation of Aqueous Ink Composition

Ingredients for each ink were mixed with the proportions shown in Table 2 and stirred. The mixture was filtered through a membrane filter of 10 μm in pore size. Thus, ink 2 and ink 3 were prepared. All the values in Table 2 are represented by mass % (percent by mass), and ion exchanged water was added so that the total of the ink composition came to 100% by mass.

TABLE 2

|  |  | Normal boiling point of organic solvent | Ink 2 | Ink 3 |
|---|---|---|---|---|
| Pigment | Carbon black |  | 2 | 2 |
| Organic solvent | Propylene glycol | 188 | 10 | 5 |
|  | 2-Pyrrolidone | 245 | 20 | 20 |
|  | Glycerin | 290 | — | 5 |
| Surfactant | BYK 348 |  | 0.4 | 0.4 |
|  | DF110D |  | 0.3 | 0.3 |
| Resin | JONCRYL 7610 |  | 4 | 4 |
| Wax | AQUACER 593 |  | 1 | 1 |
| Additive | Triethanolamine |  | 0.5 | 0.5 |
|  | EDTA |  | 0.05 | 0.05 |
| Water |  |  | Balance | Balance |
| Total |  |  | 100 | 100 |

The ingredients shown in Table 2 are as follows:
BYK 348 (silicone surfactant, produced by BYK)
DF110D (acetylene-based surfactant, Surfynol DF110D, produced by Nissin Chemical Industry)
JONCRYL 7610 (styrene-acrylic resin, produced by BASF)
AQUACER 593 (polyethylene-based wax, produced by BYK)
EDTA (Disodium ethylenediaminetetraacetate)

6. 3. Preparation of Reaction Liquid

Ingredients were mixed with the proportions shown in Table 3 and stirred. The mixture was filtered through a membrane filter of 10 μm in pore size to yield a reaction liquid. The values in Table 3 are represented by mass % (percent by mass), and ion exchanged water was added so that the total of the reaction liquid came to 100% by mass.

TABLE 3

|  | Reaction liquid 1 |
|---|---|
| Magnesium sulfate | 5 |
| 1,3-Butanediol | 10 |
| 2-Pyrrolidone | 20 |
| BYK 348 | 0.4 |
| DF110D | 0.3 |
| Water | Balance |
| Total | 100 |

The surfactants BYK348 and DF110D shown in Table 3 are the same as shown in Table 2.

6. 4. Evaluation 6. 4. 1. Preparation of Recorded Article Samples

Samples for Evaluating Image Quality

A recording medium was fed into an apparatus modified from an ink jet printer SC-550650 (manufactured by Seiko Epson), and onto which a color ink was ejected from a nozzle line filled with the ink by an ink jet method at a resolution of 720 dpi×1440 dpi and an application rate of 10 mg/inch$^2$. In the case of using the reaction liquid, the reaction liquid was placed in a nozzle line, in a staggered arrangement, of a reaction liquid head disposed upstream from the ink head in the direction in which the recording medium is transported, and was ejected by an ink jet method at a resolution of 720 dpi×720 dpi and an application rate of 1.0 mg/inch$^2$. The temperature of the recording medium during the application of the reaction liquid was set to the same temperature as that during printing shown in Table 4. The secondary drying oven was adapted to be displaceable so that the length to the secondary drying oven was varied, and the transport route was provided with a hood.

Specifically, SC-S50650 was modified as below. The printing unit hood was modified so as to cover the drying oven, and the length of the drying oven was varied for each Example. The degree of hood opening (opening angle) was varied for each Example to control the variation in surface temperature to the lowest temperature. The transporting speed and the P-P time were controlled by taking an interval time between main scanning and sub scanning. For temperature measurement, a thermocouple thermometer was stuck on the recording surface of the recording medium, and the highest temperature and the lowest temperature were measured, including how long these temperatures were maintained. The primary drying temperature of 25° C. shown in Table 4 implies that printing was performed with the heater turned off and without primary drying.

TABLE 4

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Reaction liquid | Reaction liquid 1 | Reaction liquid 1 | Reaction liquid 1 | Reaction liquid 1 | Reaction liquid 1 | Reaction liquid 1 | None | Reaction liquid 1 | Reaction liquid 1 | None |
| Application rate (mg/inch$^2$) | 0.5 | 0.5 | 0.5 | 1 | 1 | 1 | 0 | 0.5 | 0.5 | 0 |

TABLE 4-continued

| Ink | Ink 2 | Ink 2 | Ink 2 | Ink 2 | Ink 2 | Ink 3 | Ink 2 | Ink 2 | Ink 2 | Ink 1 |
|---|---|---|---|---|---|---|---|---|---|---|
| Application rate (mg/inch$^2$) | 5 | 10 | 10 | 10 | 10 | 10 | 5 | 5 | 5 | 10 |
| Primary drying temperature (° C.) | 30 | 30 | 30 | 30 | 55 | 55 | 30 | 38 | 40 | 40 |
| Transporting speed (mm/s) | 3 | 3 | 3 | 0.9 | 1 | 1 | 3 | 3 | 3 | 2.5 |
| Secondary drying temperature (° C.) | 110 | 110 | 110 | 140 | 90 | 90 | 110 | 110 | 110 | 50 |
| P-P time (s) | 55 | 55 | 55 | 187 | 146 | 146 | 55 | 55 | 55 | 168 |
| Lowest temperature (° C.) | 28 | 28 | 28 | 25 | 36 | 36 | 28 | 28 | 28 | 38 |
| Variation to lowest temperature (%) | −7% | −7% | −7% | −17% | −35% | −35% | −7% | −26% | −30% | −5% |
| Variation to highest temperature (%) | 267% | 267% | 267% | 367% | 64% | 64% | 267% | 189% | 175% | 25% |
| Average rate of temperature increase (° C./s) | 1.45 | 1.45 | 1.45 | 0.59 | 0.24 | 0.24 | 1.45 | 1.31 | 1.27 | 0.06 |
| Recording medium | Recording medium 1 | Recording medium 1 | Recording medium 2 | Recording medium 1 | Recording medium 1 | Recording medium 1 | Recording medium 1 | Recording medium 1 | Recording medium 1 | Recording medium 1 |
| P-P length (mm) | 165 | 165 | 165 | 168 | 146 | 146 | 165 | 165 | 165 | 420 |
| Dimensional stability | 0.1% | 0.5% | 0.1% | 0.9% | 0.6% | 0.2% | 0.1% | 0.4% | 0.5% | 0.3% |
| Image quality | B | C | C | B | B | D | D | A | A | B |
| Rub fastness | B | B | B | A | A | B | A | B | B | A |
| Printing speed | A | A | A | B | A | A | A | A | A | A |
| Ejection stability | A | A | A | A | C | A | A | A | B | A |
| Dimensional stability (visual) | A | A | A | A | A | A | A | A | A | A |

| | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|
| Reaction liquid | Reaction liquid 1 | Reaction liquid 1 | Reaction liquid 1 | Reaction liquid 1 | Reaction liquid 1 | None | Reaction liquid 1 | Reaction liquid 1 |
| Application rate (mg/inch$^2$) | 0.5 | 2 | 1 | 2 | 1 | 0 | 1 | 2 |
| Ink | Ink 2 | Ink 2 | Ink 2 | Ink 2 | Ink 2 | Ink 2 | Ink 2 | Ink 2 |
| Application rate (mg/inch$^2$) | 10 | 20 | 10 | 20 | 10 | 5 | 10 | 20 |
| Primary drying temperature (° C.) | 30 | 30 | 55 | 25 | 30 | 25 | 43 | 30 |
| Transporting speed (mm/s) | 11 | 3 | 5 | 3 | 15 | 3 | 5 | 3 |
| Secondary drying temperature (° C.) | 116 | 116 | 116 | 125 | 116 | 25 | 116 | 145 |
| P-P time (s) | 14 | 55 | 30 | 55 | 11 | 55 | 30 | 55 |
| Lowest temperature (° C.) | 28 | 28 | 30 | 25 | 28 | 25 | 25 | 25 |
| Variation to lowest temperature (%) | −7% | −7% | −45% | 0% | −7% | 0% | −42% | −17% |
| Variation to highest temperature (%) | 287% | 287% | 111% | 400% | 287% | 0% | 170% | 383% |

TABLE 4-continued

| | | | | | | | | |
|---|---|---|---|---|---|---|---|---|
| Average rate of temperature increase (° C./s) | 6.14 | 1.56 | 2.03 | 1.82 | 7.82 | 0.00 | 2.43 | 2.09 |
| Recording medium | Recording medium 1 | Recording medium 1 | Recording medium 1 | Recording medium 1 | Recording medium 1 | Recording medium 1 | Recording medium 1 | Recording medium 1 |
| P-P length (mm) | 157 | 165 | 166 | 165 | 165 | 165 | 151 | 165 |
| Dimensional stability | 0.2% | 0.9% | 1.1% | 1.5% | 2.0% | 0.0% | 1.2% | 1.7% |
| Image quality | C | B | B | D | C | E | A | B |
| Rub fastness | B | A | A | A | A | C | A | A |
| Printing speed | A | A | A | A | A | A | A | A |
| Ejection stability | A | A | A | A | A | A | B | A |
| Dimensional stability (visual) | A | A | B | B | B | A | B | B |

The items shown in Table 4 are as follows:
Primary drying temperature (° C.): the highest surface temperature of the recording medium during the application of the ink composition
Transporting speed (mm/s): quotient of P-P length (mm) divided by P-P time (s)
Secondary drying temperature (° C.): the highest surface temperature of the recording medium in the secondary drying oven
P-P time (s): period from the completion of the application of the ink onto a point of the recording medium until the point of the recording medium reaches the secondary drying temperature
Lowest temperature (° C.): the lowest surface temperature of the recording medium
Variation (%) to lowest temperature: {(lowest temperature − primary drying temperature)/primary drying temperature} × 100
Variation (%) to highest temperature: {(secondary drying temperature − primary drying temperature)/primary drying temperature} × 100.
Average rate (° C./s) of temperature increase: {(secondary drying temperature − primary drying temperature)/P-P time} × 100
Recording media: recording medium 1 being a polyvinyl chloride sheet ORAJET 3164XG-010 (1370 mm) with gloss polyvinyl chloride gray glue of 1370 mm in width, produced by ORAFOL; and recording medium 2 being prepared by processing Recording medium 1 to a smaller width of 300 mm.
P-P length (mm): distance from the point at which the application of the ink onto the recording medium is completed to the point at which the surface temperature reaches the secondary drying temperature.

The variations in surface temperature to the lowest temperature and to the highest temperature were rounded off to the nearest integer, and the average rate of temperature increase was rounded off to the second decimal place.

6. 4. 2. Dimensional Stability

After an image measuring 1250 mm×600 mm (270 mm×600 mm for recording medium 2) was formed on recording medium 1, the recording medium was dried under the conditions shown in Table 4, and the difference in width between the recording medium and the release sheet was measured for deformation in the width direction. If the deformation is less than 1%, the recording medium is usable.

6. 4. 3. Image Quality

A 10 mm×10 mm solid pattern was formed in the same manner as above and visually checked for unevenness therein. The image quality of the solid pattern was rated according to the following criteria:
A: No unevenness in terms of density was observed in the pattern.
B: An unevenness in terms of density that was not visually observed was observed through a magnifier.
C: Small uneven portions were visually observed.
D: Although large uneven portions were observed, the outline of the pattern was clear.
E: The outline of the pattern bled and became obscure.

6. 4. 4. Rub Fastness

Fastness to rubbing was measured with a Gakushin-type rubbing tester AB-301 (manufacture by TESTER SANGYO). More specifically, the surface of the recording medium on which an image was recorded was reciprocally rubbed 30 times or until the coating of the ink peeled, at a load of 300 g with a rubber provided with a white cloth (according to JIS L 0803). The degree of peeling from the surface of the recording medium was visually observed. The results were rated according to the following criteria:
A: A peeling was not observed even by reciprocal rubbing between 20 times and 29 times.
B: A peeling was observed by reciprocal rubbing between 10 times and 19 times.
C: A peeling was observed by 9 times or less of reciprocal rubbing.

6. 4. 5. Transporting Speed

The transporting speed was evaluated in terms of print productivity according to the following criteria:
A: The transporting speed was 10 mm/s or more.
B: The transporting speed was in the range of 1 mm/s to less than 10 mm/s.
C: The transporting speed was less than 1 mm/s.

6. 4. 6. Ejection Stability

Recording was continued for 1 hour under the same conditions as in "6. 4. 1. Preparation of Recorded Article Samples". After the recording, it was checked whether or not the ink was ejected through the nozzle line (360 nozzles), and the results were rated according to the following criteria:
A: There was no nozzle in which ejection failure occurred.
B: Ejection failure occurred in one to three nozzles.
C: Ejection failure occurred in four or more nozzles.

6. 4. 7. Dimensional Stability (Visual Test)

The portion of the recording medium where a difference in width from the release sheet occurred in the above dimensional stability test was visually observed with a distance of 50 cm from the recording medium and rated according to the following criteria:
A: A misalignment was not seen between the edge of the recording medium and the edge of the release sheet.
B: A misalignment was seen between the edge of the recording medium and the edge of the release sheet.

6. 5. Evaluation Results

Examples 1 to 12 were superior to the Comparative Examples in dimensional stability, rub fastness, and image quality, regardless of using an aqueous ink or using a solvent-based ink. On the other hand, the Comparative Examples were inferior in dimensional stability, rub fastness, or image quality.

More specifically, in Examples 2 and 3, the application rate of the ink was higher than that in Example 1, while the reaction liquid was used. Even though the application rate of the ink was high, the recorded image was not significantly degraded because of the use of the reaction liquid. However, since the amount of solvent that penetrates and swells the recording medium was increased due to the high application rate of the ink, the recording medium tended to deform when the average rate of temperature increase was increased. In Example 4, in which recording was performed at a lower transporting speed and a higher secondary drying temperature than recording in Example 1, the image quality was improved, but the recording medium tended to deform. In Example 5, in which recording was performed at a higher primary drying temperature, a lower transporting speed, and a low secondary drying temperature, the recording medium was more easily deformed than in Example 1, and the ejection stability was inferior. Example 6, in which the ink contained glycerin, resulted in poor image quality. Example 7, in which the reaction liquid was not used, resulted in image quality inferior to that in Example 1. Examples 8 and 9, in which the primary drying temperature was set in a beneficial range, resulted in superior image quality to Example 1 but in slightly inferior dimensional stability. Example 10, in which a solvent-based ink was used, resulted in satisfactory results as in the case of using an aqueous ink. Example 11, in which the average rate of temperature increase was high, resulted in slightly poor image quality and rub fastness. Example 12, in which the application rates of the reaction liquid and the ink were higher than those in Example 1, resulted in slightly poor dimensional stability.

Comparative Example 1, in which recording was performed with a large variation to the lowest temperature and at a high primary drying temperature, resulted in poor dimensional stability and ejection stability. Comparative Example 2, in which the variation to the highest temperature was large because primary heating was not performed, resulted in poor image quality and dimensional stability. Comparative Example 3, in which the average rate of temperature increase was excessively high, resulted in poor dimensional stability. Comparative Example 4, in which the recording medium was not heated, resulted in no dimensional changes, but in poor image quality and poor rub fastness. Comparative Example 5, in which the variation to the lowest temperature was −42%, resulted in poor dimensional stability. Comparative Example 6, in which the variation to the highest temperature was excessively large, resulted in poor dimensional stability as well.

The invention is not limited to the above-described embodiments, and various modifications may be made. For example, the invention includes embodiments having substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosures of Japanese Patent Application Nos. 2017-030065, filed Feb. 21, 2017 and 2017-101703, filed May 23, 2017 are expressly incorporated by reference herein.

What is claimed is:

1. A recording method, comprising:
applying an ink composition onto a recording medium;
primarily drying the recording medium by increasing a surface temperature of the recording medium to a primary drying temperature during the application of the ink composition onto the recording medium;
transporting the recording medium onto which the ink composition has been applied to a secondary drying device; and
secondarily drying the recording medium by increasing the surface temperature of the recording medium to a secondary drying temperature with the secondary drying device,
wherein a variation in surface temperature of the recording medium from the primary drying temperature to a lowest temperature and the variation in surface temperature of the recording medium from the primary drying temperature to a highest temperature, in a period from completion of the application of the ink composition to completion of the secondary drying are −40% or more and 370% or less, respectively, relative to the primary drying temperature, and
wherein the surface temperature of the recording medium is increased to the secondary drying temperature at an average rate of 7° C./s or less after the completion of the application of the ink composition.

2. The recording method according to claim 1, wherein the recording medium has a width of 350 mm or more.

3. The recording method according to claim 1, wherein the variation in surface temperature of the recording medium to the lowest temperature is −35% or more.

4. The recording method according to claim 1, wherein the secondary drying temperature is greater than or equal to the primary drying temperature.

5. The recording method according to claim 1, wherein the surface temperature of the recording medium is caused to reach the secondary drying temperature within a period of 250 s from the completion of the application of the ink composition.

6. The recording method according to claim 1, wherein the primary drying temperature is in a range of 30° C. to 60° C., and the secondary drying temperature is in a range of 50° C. to 160° C.

7. The recording method according to claim 1, wherein the recording medium is transported along a transport path provided with at least one of a heating device and a heat-retaining device.

8. The recording method according to claim 1, wherein the recording medium includes a release sheet.

9. The recording method according to claim 1, wherein the surface temperature of the recording medium is caused to reach the secondary drying temperature in a period of 60 s or less after the recording medium has been transported to the secondary drying device.

10. The recording method according to claim 1, wherein the recording medium is transported along a transport path having a length of 500 mm or less from a point at which the application of the ink composition is completed to a point at which the recording medium having the ink applied thereto reaches the secondary drying temperature.

11. The recording method according to claim 1, wherein the ink composition is one of an aqueous ink composition containing a coloring material, water, a resin, and a water-soluble organic solvent and a solvent-based ink composition containing a coloring material and an organic solvent.

12. The recording method according to claim 1, wherein the ink composition is an aqueous ink composition containing an organic solvent having a normal boiling point in a range of 150° C. to 280° C., wherein a content of an organic solvent having a normal boiling point of more than 280° C. in the aqueous ink composition is 3% by mass or less.

13. The recording method according to claim 1, wherein the application of the ink composition is performed by ejecting the ink composition from an ink jet head.

14. The recording method according to claim 1, wherein the recording medium is non-absorbent or poorly absorbent.

15. The recording method according to claim 1, further comprising applying a reaction liquid onto the recording medium, the reaction liquid containing a flocculant configured to form an aggregate of at least one constituent of the ink composition.

16. The recording method according to claim 1, wherein the maximum application rate of the ink composition applied to the recording medium is 3 mg/inch$^2$ or more.

17. The recording method according to claim 1, wherein the primary drying temperature is 40° C. or less, and the variation in surface temperature of the recording medium to the lowest temperature is −10% or more.

18. A recording apparatus comprising:
an ink ejector configured to apply an ink composition onto a recording medium;
a primary drying device configured to primarily dry the recording medium by increasing a surface temperature of the recording medium to a primary drying temperature during the application of the ink composition onto the recording medium;
a transporting mechanism configured to transport the recording medium onto which the ink composition has been applied to a secondary drying device; and
the secondary drying device configured to secondarily dry the recording medium by increasing the surface temperature of the recording medium to a secondary drying temperature with the secondary drying device,
wherein a variation in surface temperature of the recording medium from the primary drying temperature to a lowest temperature and the variation in surface temperature of the recording medium from the primary drying temperature to a highest temperature, in a period from completion of the application of the ink composition to completion of the secondary drying are −40% or more and 370% or less, respectively, relative to the primary drying temperature, and
wherein the surface temperature of the recording medium is increased to the secondary drying temperature at an average rate of 7° C./s or less after the completion of the application of the ink composition.

19. The recording apparatus according to claim 18 wherein the recording medium has a width of 350 mm or more.

20. The recording apparatus according to claim 18 wherein the variation in surface temperature of the recording medium to the lowest temperature is −35% or more.

* * * * *